US008433242B2

(12) United States Patent
Kenington et al.

(10) Patent No.: US 8,433,242 B2
(45) Date of Patent: Apr. 30, 2013

(54) ACTIVE ANTENNA ARRAY FOR A MOBILE COMMUNICATIONS NETWORK WITH MULTIPLE AMPLIFIERS USING SEPARATE POLARISATIONS FOR TRANSMISSION AND A COMBINATION OF POLARISATIONS FOR RECEPTION OF SEPARATE PROTOCOL SIGNALS

(75) Inventors: Peter Kenington, Chepstow (GB); Martin Weckerle, Ulm (DE); Dirk Neumann, Ulm (DE)

(73) Assignee: Ubidyne Inc., Wilmington, DE (US)

( * ) Notice: Subject to any disclaimer, the term of this patent is extended or adjusted under 35 U.S.C. 154(b) by 533 days.

(21) Appl. No.: 12/648,852

(22) Filed: Dec. 29, 2009

(65) Prior Publication Data

US 2011/0159810 A1 Jun. 30, 2011

(51) Int. Cl.

| | |
|---|---|
| ***H04B 7/14*** | (2006.01) |
| ***H04B 1/38*** | (2006.01) |
| ***H04B 7/00*** | (2006.01) |
| ***H04M 1/38*** | (2006.01) |

(52) U.S. Cl.
USPC ........... 455/25; 455/562.1; 455/561; 455/525

(58) Field of Classification Search ............... 455/562.1, 455/561, 560, 524, 525, 25
See application file for complete search history.

(56) References Cited

U.S. PATENT DOCUMENTS

| | | | | |
|---|---|---|---|---|
| 4,424,500 | A * | 1/1984 | Viola et al. | 333/128 |
| 4,638,317 | A * | 1/1987 | Evans | 342/373 |
| 5,461,389 | A | 10/1995 | Dean | |
| 5,812,088 | A * | 9/1998 | Pi et al. | 342/373 |
| 6,067,054 | A | 5/2000 | Johannisson et al. | |
| 6,081,233 | A * | 6/2000 | Johannisson | 342/373 |
| 6,094,165 | A * | 7/2000 | Smith | 342/373 |
| 6,282,434 | B1 | 8/2001 | Johannisson et al. | |
| 6,442,371 | B1 * | 8/2002 | Lyu | 455/67.11 |
| 6,640,110 | B1 * | 10/2003 | Shapira et al. | 455/562.1 |
| 6,785,559 | B1 * | 8/2004 | Goldberg et al. | 455/562.1 |
| 7,043,270 | B2 | 5/2006 | Judd et al. | |
| 7,069,053 | B2 | 6/2006 | Johannisson et al. | |
| 7,236,131 | B2 | 6/2007 | Fager et al. | |

(Continued)

FOREIGN PATENT DOCUMENTS

WO 99/17576 4/1999

OTHER PUBLICATIONS

U.S. Appl. No. 12/563,693 entitled: Antenna Array, Network Planning System, Communication Network and Method for Relaying Radio Signals With Independently Configurable Beam Pattern Shapes Using a Local Knowledge, filed Sep. 21, 2009.

*Primary Examiner* — Tilahun B Gesesse

(57) ABSTRACT

The present disclosure teaches an active antenna array for a mobile communications network. The active antenna array comprises a plurality of first polarization antenna elements and a plurality of second polarization antenna elements. The plurality of first polarization antenna elements is connected to a first protocol signal generator. The plurality of first polarization antenna elements are adapted to radiate an individual first protocol transmit signal. An individual one of the plurality of second polarization antenna element is connected to an individual one of a plurality of second protocol signal generators. The plurality of second polarization antenna elements is adapted to radiate an individual second protocol transmit signal. An individual one of the plurality of first polarization antenna elements and the individual one of the plurality of second polarization antenna elements are adapted to receive both, an individual first protocol receive signal and an individual second protocol receive signal.

32 Claims, 14 Drawing Sheets

U.S. PATENT DOCUMENTS

| | | | | |
|---|---|---|---|---|
| 7,236,807 | B1 | 6/2007 | Shapira et al. | |
| 7,583,982 | B2 * | 9/2009 | Olesen et al. | 455/562.1 |
| 8,064,958 | B2 * | 11/2011 | Skarby et al. | 455/562.1 |
| 8,208,962 | B2 * | 6/2012 | Thomas | 455/562.1 |
| 8,228,840 | B2 * | 7/2012 | Skarby | 370/328 |
| 8,320,825 | B2 * | 11/2012 | Goransson et al. | 455/7 |
| 2004/0204109 | A1 | 10/2004 | Hoppenstein | |
| 2008/0254845 | A1 | 10/2008 | Chang et al. | |
| 2008/0318632 | A1 | 12/2008 | Rofougaran et al. | |
| 2009/0181722 | A1 | 7/2009 | Stensson | |

* cited by examiner

ACTIVE ANTENNA ARRAY FOR A MOBILE COMMUNICATIONS NETWORK WITH MULTIPLE AMPLIFIERS USING SEPARATE POLARISATIONS FOR TRANSMISSION AND A COMBINATION OF POLARISATIONS FOR RECEPTION OF SEPARATE PROTOCOL SIGNALS

CROSS-REFERENCE TO RELATED APPLICATIONS

The present application is related to U.S. patent application Ser. No. 12/648,773 entitled "ACTIVE ANTENNA ARRAY AND METHOD FOR RELAYING FIRST AND SECOND PROTOCOL RADIO SIGNALS" filed Dec. 29, 2009, which is incorporated in its entirety. The present application is further related to U.S. patent application Ser. No. 12/648,713 entitled "ACTIVE ANTENNA ARRAY WITH MULTIPLE AMPLIFIERS FOR A MOBILE COMMUNICATIONS NETWORK AND METHOD OF PROVIDING DC VOLTAGE TO AT LEAST ONE PROCESSING ELEMENT" filed Dec. 29, 2009, which is incorporated in its entirety. The present application is further related to U.S. patent application Ser. No. 12/648,809 entitled "METHOD AND APPARATUS FOR TITLING BEAMS IN A MOBILE COMMUNICATIONS NETWORK" filed Dec. 29, 2009, which is incorporated in its entirety.

FIELD OF THE INVENTION

The field of the invention relates to an active antenna array for a mobile communications network and a method for relaying radio signals in a mobile communications network.

BACKGROUND OF THE INVENTION

The use of mobile communications networks has increased over the last decade. Operators of the mobile communications networks have increased the number of base stations in order to meet an increased request for service by users of the mobile communications networks. The operators of the mobile communications networks wish to reduce the running costs of the base station. It is one option to implement the radio system as an antenna-embedded radio forming an active antenna array of the present disclosure. The antenna-embedded radio may be implemented on one or more chips, at least for some of the components of the antenna embedded radio. The antenna embedded radio reduces the space needed to house the hardware components of the base station. Power consumption during normal operation of the active antenna array is reduced when implementing the active antenna array on the one or more chips.

Mobile communications networks use protocols when relaying radio signals. Examples of protocols for mobile communications systems include the GSM protocol but are not limited thereto.

New types of protocols for radio signals (or pertaining to radio signals) in mobile communication networks have been developed in order to meet an increased need for mobile communication and to provide higher data rates to handsets as well as an increased flexibility in adapting radio signals relayed by the active antenna array to specific needs of an individual site or cell of the mobile communications network.

Examples of newer types of protocol for protocol radio signals are: the unified mobile telecommunication service protocol (UMTS), third generation long term evolution (3GLTE) protocol, freedom of mobile multi media access radio (FMRA) protocol, wideband code division multiple access (WCDMA) protocol and Worldwide interoperability for microwave access (WiMAX) protocol, but are not limited thereto.

Radio signals using the first type of protocol shall be referred to herein as first protocol radio signals. Radio signals using the second newer type of protocol shall be referred to herein as second protocol radio signals.

The operators of the mobile telecommunications networks are interested in supporting the first protocol radio signals and the second protocol radio signals. Therefore an interest exists to provide active and/or passive antenna arrays relaying both the first protocol radio signals and the second protocol radio signals simultaneously.

The second protocol radio signals often require flexibility in beam shaping and beam steering not often required with the first protocol radio signals.

In the prior art it was possible to provide an active antenna array for the second protocol radio signals and a further antenna array relaying the first protocol radio signals. Such an approach is rather expensive for the operators of the mobile communications networks as two separate sets of antenna arrays need to be set up and maintained.

Combined passive antenna arrays for mobile communication networks are known that relay both the first protocol radio signals and the second protocol radio signals concurrently. These combined antenna arrays of the prior art unfortunately do not provide the increased flexibility in terms of beam shaping as often required with the second protocol radio signals and are also less power efficient due to the losses experienced by the first and second protocol radio signals in the coaxial cables which link the first and second protocol radio base-stations to the combined passive antenna.

FIG. 1 shows a passive antenna array 1*a* of the prior art. The passive antenna array 1*a* of the prior art is adapted to relay two different air interface standards. One of the air interface standards is the first protocol, for example GSM or UMTS but not limited thereto, and another one of the air interface standards is the second protocol, for example UMTS or LTE, but is not limited thereto.

The first protocol radio signal comprises a general first protocol transmit signal 70Tx and a general first protocol receive signal 70Rx. The first protocol general transmit signal 70Tx is generated by a first protocol generator 301. The first protocol generator 301 is typically co-located with a first protocol base transceiver station (BTS) 10-1, 10-2, 10-3 . . . , 10-N. The second protocol radio signal comprises a general second protocol transmit signal 75Tx and a general second protocol receive signal 75Rx. The general first protocol transmit signal 70Tx and the general first protocol receive signal are present between the first protocol BTS 10-1 and a duplexer 20. The general second protocol transmit signal 75Tx and the general second protocol receive signal 75Rx are present between a second protocol base transceiver station (BTS) 10-2 and the duplexer 20. The duplexer 20 combines the general first protocol transmit signal 70Tx and the general second protocol transmit signal 75Tx with a low combiner loss. The low combiner loss is much lower than a loss present with a 3 dB hybrid or Wilkinson combiner. It is a disadvantage of the duplexer 20 to require a roll-off band between the general first protocol transmit signal 70Tx and the general second protocol transmit signal 75Tx as well as between the general first protocol receive signal 70Rx and the general second protocol receive signal 75Rx. The duplexer 20 separates a general first protocol receive signal 70Rx and a general second protocol receive signal 75Rx such that the general first protocol receive signal 70Rx reaches the first protocol BTS 10-1 and the general second protocol receive signal 75Rx reaches the second protocol BTS 10-2.

The required roll-off wastes bandwidth as the roll-off band is within the bandwidth of the first protocol radio signals and bandwidth of the second protocol radio signals. Therefore it is expensive to use the duplexer 20 in terms of spectrum license fees, as the license fees also need to be paid for the roll-off band of the duplexer 20. The duplexer 20 is further inflexible with respect to frequency bandwidths for the first protocol radio signals and the second protocol radio signals. The bandwidth allocated to the first protocol radio signal and a bandwidth allocated to the second protocol radio signal are, in the prior art, fixed.

A DC voltage adder 215 is located between the duplexer 20 and a tower mounted amplifier (TMA) 80. The DC voltage adder 215 is capable of adding a DC voltage to a signal path relaying radio frequency signals. The advantage of using the DC voltage adder 215 between the duplexer 20 and the TMA 80 is that a length of a DC connection cable from a first DC voltage supply 210 to the TMA 80 can be reduced, since the DC can be carried by the coaxial feeder cable to the TMA along with the RF signals. Typically the TMA 80 is mounted on a tower. Hence the cable from the duplexer 20 to the TMA 80 may be several meters long or even substantially longer. It will be appreciated that long DC lines add to overall costs of the active antenna array and may be vulnerable to any radio frequency (RF) impinging thereon.

The DC voltage adder 215 may be implemented using a bias T as known in the art, or so-called RF chokes using an inductance tailored such that a radio frequency signal travelling along the coaxial feeder cable may not pass the DC voltage adder 215. Conversely, the first DC voltage 205 is capable of passing the DC voltage adder 215. The DC voltage adder 215 is of low impedance to the DC voltage but of high impedance to RF signals relayed along the coaxial cable. Typically the duplexer 20 does not have DC conductivity. Hence the DC voltage adder 215 needs to be present downstream of the duplexer 20. Otherwise the first DC voltage 205 provided by the first DC voltage supply 210 will not reach the TMA 80 to power amplifiers or any other active components within the TMA 80.

A coaxial feeder cable forwards the general first protocol transmit signal 70Tx and the general second protocol transmit signal 75Tx from the TMA 80 to the passive antenna array 1*a*. The coaxial feeder cable further forwards a general first protocol receive signal 70Rx, and the second protocol receive signal 75Rx from the passive antenna array 1*a* to the TMA 80. The general first protocol transmit signal 70Tx is split into individual first protocol transmit signals 70Tx-1, 70Tx-2, . . . , 70Tx-N at a port 11 of the passive antenna array 1*a* reaching an individual one of the antenna elements Ant-1, Ant-2, . . . , Ant-N of the passive antenna array 1*a*. A corporate feed network may be used for splitting the general first protocol transmit signal 70Tx into the individual first protocol transmit signals 70Tx-1, 70Tx-2, . . . , 70Tx-N. The corporate feed network is illustrated in FIG. 1 by the thick black lines within the body of the passive antenna array 1*a*.

In FIG. 1 only 16 of the antenna elements Ant-1, ant-2, . . . , Ant-N are shown. The individual first protocol transmit signal 70Tx-1, 70Tx-2, . . . , 70Tx-N is only shown for the individual antenna elements Ant-1 and Ant-16 in FIG. 1 for the sake of clarity. The individual transmit signal 70Tx-1, 70Tx-2, . . . , 70Tx-N is typically present for each one of the antenna elements Ant-1, Ant-2, . . . , Ant-N, but not limited thereto.

The general second protocol transmit signal 75Tx is split into a plurality individual second protocol transmit signals 75Tx-1, 75Tx-2, . . . , 75Tx-N reaching the individual antenna element Ant-1, Ant-2, . . . , Ant-N of the passive antenna array 1*a*. A corporate feed network may be used for splitting the general first protocol transmit signal 70Tx into the individual first protocol transmit signals 70Tx-1, 70Tx-2, . . . , 70Tx-N. The corporate feed network is illustrated in FIG. 1 by the thick black lines within the body of the passive antenna array 1*a*. The individual second protocol transmit signal 75Tx-1, 75Tx-2, . . . , 75Tx-N is only shown for the individual antenna elements Ant-1 and Ant-16 in FIG. 1 for the sake of clarity but may be present for more than two of the antenna elements Ant-1, Ant-2, . . . , Ant-N.

U.S. Pat. No. 7,236,131 B2 to Fager et al. teaches an antenna comprising a first radiating element to provide a first axis of polarisation, and a second radiating element to provide a second axis of polarisation. The first axis of polarisation may be orthogonal or orthogonal at least in part, to the second axis of polarisation. The first and second axes together may result in an omnidirectional, or at least partially omnidirectional gain pattern for the antenna. RF signals may be propagated on the first and second axes using the same communication standard on both axes, and/or using a different communication standard on each of the axes. In accordance with one or more embodiments, the first axis of polarisation may be utilised for a first MIMO communication channel and the second axis of polarisation may be utilised for a second MIMO communication channel.

US 2008/0254845 A1 to North America Intellectual Property Cooperation teaches an antenna module and a signal-processing module using the antenna module to process a plurality of wireless signals. The signal processing module includes the antenna module, a first processing circuit and a second processing circuit. The antenna module includes at least a first antenna, at least a second antenna and a shielding portion. The first antenna is utilised to transmit or receive signals corresponding to a first wireless communication standard, the second antenna is utilised to transmit or receive signals corresponding to a second wireless communication standard, and the shielding portion is disposed between the first antenna and the second antenna. The first processing circuit is coupled to the first antenna for processing signals of the first antenna and the second processing circuit is coupled to the second antenna for processing signals of the second antenna.

SUMMARY OF THE INVENTION

The present disclosure teaches an active antenna array for a mobile communications network. The active antenna array comprises a plurality of first polarisation antenna elements and a plurality of second polarisation antenna elements. The plurality of first polarisation antenna elements is connected to a first protocol signal generator. The plurality of first polarisation antenna elements is adapted to radiate an individual first protocol transmit signal. An individual one of the plurality of second polarisation antenna elements is connected to an individual one of a plurality of second protocol signal generators. The plurality of second polarisation antenna elements is adapted to radiate an individual second protocol transmit signal. An individual one of the plurality of first polarisation antenna elements and the individual one of the plurality of second polarisation antenna elements are adapted to receive both an individual first protocol receive signal and an individual second protocol receive signal.

The individual first protocol receive signal comprises a first protocol first polarisation receive signal and a first protocol second polarisation receive signal.

The individual second protocol receive signal comprises a second protocol first polarisation receive signal and a second protocol second polarisation receive signal.

The term "individual relay path" as used herein shall be construed as a path along which radio signals for an individual one of the plurality of first polarisation antenna elements or an individual one of the plurality of second polarisation antenna elements are relayed. For a transmitting of radio signals the relay path comprises a first protocol transmit path. The first protocol transmit path runs from the first signal generator via the corporate feed network to an individual one of the plurality of first polarisation antenna elements. A second protocol transmit path runs from the individual one of the plurality of second protocol signal generators to an individual one of the plurality of second polarisation antenna elements.

It will be noted that for a transmitting of first protocol transmit signals an individual one of the first polarisation antenna elements is used and for the transmitting of an individual one of the second protocol transmit signals an individual one of the second polarisation antenna elements is used.

The receive path comprises a first protocol first polarisation receive path. The first protocol first polarisation receive path runs from the individual first polarisation antenna element via the corporate feed network to the first input and/or a diversity port. A second protocol first polarisation receive path runs from the individual first polarisation antenna element to an individual second protocol receiver. It will be noted that the first protocol first polarisation receive path is partially identical with the second protocol first polarisation receive path. A first protocol second polarisation receive path runs from the individual one of the plurality of second polarisation antenna elements via the corporate feed network to the first port and/or the diversity port. A second protocol second polarisation receive path runs from the individual one of the plurality of second polarisation antenna elements to an individual one of the second protocol receivers. It will be noted that the first protocol second polarisation receive path and the second protocol second polarisation receive path are at least partially identical.

For a reception of first protocol receive signals the individual first polarisation antenna element and the individual second polarisation antenna element will be used. Conversely, for a transmission of first protocol transmit signals and second protocol transmit signals only one of: the plurality of first polarisation antenna elements and the plurality of the second polarisation antenna elements will be used.

The term "first protocol link" as used herein may comprise a coaxial cable but is not limited thereto. The first protocol link is adapted to relay a first protocol transmit signal to the first port. The first protocol link may further be adapted to relay a first protocol receive signal from the first port to a first protocol receiver.

The term "first protocol" pertaining to first protocol radio signals as used herein shall be construed as comprising the GSM protocol and the unified mobile telecommunication service protocol (UMTS) but is not limited thereto.

The term "second protocol" pertaining to a second protocol radio signal as used herein shall be construed as the UMTS protocol, a third generation long term evolution (3 GLTE) protocol, a freedom of mobile multimedia access radio (FMRA) protocol and a wideband code division multiple access (WCDMA) protocol but is not limited thereto.

It is conceivable that a protocol which is a member of the group of first protocols may also be a member of the second group of protocols. The presence of a specific protocol in both the group of first protocols and the group of second protocols, may be relevant when using different variants of a protocol or use of the same protocol by different network operators sharing the same base station site and some or all of the site equipment.

The term "phase weighting, amplitude weighting or delay" shall be construed as comprising a phase weighting, an amplitude weighting or a delay as provided by passive networks known in the art. The phase weighting, the amplitude weighting or the delay may comprise a set of possible parameter values for at least one of the phase weighting, the amplitude weighting or the delay. The phase weighting, the amplitude weighting or the delay are applied in an analogue manner. Typically, the passive networks known in the art prevent an arbitrary selection of the phase weighting, the amplitude weighting or the delay. Remote electrical tilt (RET) systems utilise electro-mechanically variable phase shift elements to vary a beam pattern relayed by the prior art antenna array 1*a*. RET systems will act on all transmit signals fed to the prior art antenna 1*a* and will not act separately for first protocol transmit signals 70Tx-1, 70Tx-2, . . . , 70Tx-N and second protocol transmit signals 75Tx-1, 75Tx-2, . . . , 75Tx-N.

The term "the variable phase weighting, the variable amplitude weighting or the variable delay" as used herein shall be construed as comprising not only a fixed set of possible parameter values for at least one of the variable amplitude weighting, the variable phase weighting and the variable delay. The variable phase weighting, the variable amplitude weighting or the variable delay provide an arbitrary selection of at least one of the phase weighting, the amplitude weighting or the delay between individual ones of the antenna elements. The variable phase weighting, the variable amplitude weighting or the variable delay may comprise a variation in time of at least one of the phase weighting, the amplitude weighting or the delay between the individual ones of the antenna elements. The variable phase weighting, the variable amplitude weighting or the variable delay are applied digitally. The variable phase weighting, the variable amplitude weighting or the variable delay may comprise a variation in time of at least one of the phase weighting, the amplitude weighting or the delay between the individual ones of the antenna elements selected from the first polarisation antenna elements and/or the second polarisation antenna elements.

The variable phase weighting, the variable amplitude weighting may also be provided by the multiplication of the relevant transmit and/or receive signal by 'beamforming vectors'. The 'beamforming vectors' are sets of coefficients which, when multiplied with the relevant transmit and/or receive signal, produce the required degree of at least one of the variable phase weighting, the variable amplitude weighting or the variable delay between individual ones of the antenna elements (of the first polarisation antenna elements and/or the second polarisation antenna elements). Such multiplication may be provided vectorially, in either polar (amplitude and phase) format or in Cartesian (I/Q) format. In all cases, within the present disclosure, whenever (variable) phase weighting, (variable) amplitude weighting or (variable) delay are discussed, the use of 'beamforming vectors' to generate such modifications is explicitly included. Details about the concept of 'beamforming vectors' are given in an earlier application U.S. Ser. No. 12/563,693 entitled "Antenna array, network planning system, communication network and method for relaying radio signals with independently configurable beam pattern shapes using a local knowledge"; which is incorporated herein in its entirety.

The term "first protocol radio signal" shall be construed comprising at least one of a general first protocol transmit signal, a general first protocol receive signal, a general first protocol diversity receive signal, an at least one individual first protocol transmit signal, the first protocol first polarisation receive signal and the first protocol second polarisation receive signal.

The term “second protocol (radio) signal” shall be construed comprising at least one of a general second protocol transmit signal, a general second protocol receive signal, an at least one individual second protocol transmit signal and the at least one individual second protocol first polarisation receive signal and the at least one second protocol second polarisation receive signal.

The present disclosure further teaches a method for relaying radio signals in a mobile communications network. The method comprises a step of concurrently receiving an individual first protocol receive signal and an individual second protocol receive signal at an individual one of a plurality of first polarisation antenna elements and an individual one of a plurality of second polarisation antenna elements. The method comprises a transmitting of individual first protocol transmit signals generated by analogue means using at least one individual one of the plurality of first polarisation antenna elements. The method further comprises a transmitting of individual second protocol transmit signals generated by digital means using at least one individual one of the plurality of second polarisation antenna elements. The method further comprises a transmitting of individual first protocol transmit signals using at least an individual one of the plurality of second polarisation antenna elements.

The present disclosure further teaches a computer program product comprising a computer useable medium having a control logic stored therein for causing a computer to manufacture the active antenna array for a mobile communications network of the present disclosure.

The present disclosure further teaches a computer program product comprising a computer useable medium have an control logic stored therein for causing a computer to execute the method for relaying radio signals in a mobile communications network.

The present disclosure further teaches a chip set for controlling the active antenna array for a mobile communications network of the present disclosure.

DETAILED DESCRIPTION OF THE INVENTION

Figure 2:
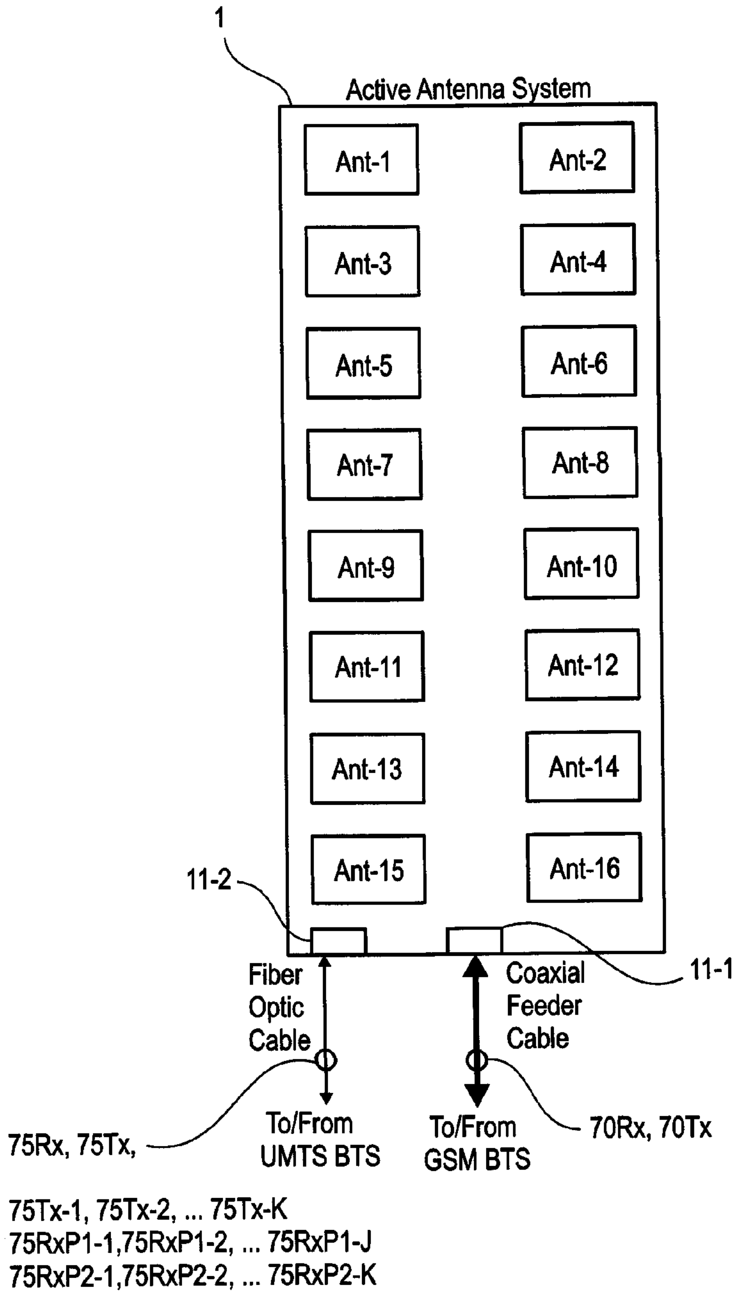
FIG. 2 shows the active antenna array

FIG. 2 shown an outline of the active antenna array 1 of the present disclosure. The active antenna array 1 allows an existing first protocol BTS 10-1 to be used in conjunction with an antenna-embedded radio for the second protocol radio signals, such as the UMTS protocol. The active antenna array 1 has two ports. The first port 11-1 is fed with the general first protocol transmit signal 70Tx. The first port 11-1 further provides the general first protocol receive signal 70Rx. Typically coaxial feeder cable is connected to the first port 11-1. The example of the coaxial feeder cable corresponds to the first protocol link. The coaxial feeder cable ending at the first port 11-1 carries the general first protocol transmit signal 70Tx and the general first protocol receive signals 70Rx. The first protocol transmit signal 70Tx is typically substantially higher in power than the general receive signal 70Rx. There may be two or more orders of magnitude in power between the general first protocol transmit signal 70Tx and the general first protocol receive signal 75Rx.

A second port 11-2 is a digital port, for example interfacing with a fibre-optic cable. The fibre optic-cable carries the second protocol signals. The second protocol signals are typically provided at digital baseband. Active electronics in the active antenna array 1 performs functions including: Crest factor reduction, beamforming, predistortion, up conversion/down conversion to/from radio frequency (RF), power amplification etc. Without any limitation the second protocol signals may be provided at an intermediate frequency band between the base band and a transmit frequency band of the active antenna array 1. As mentioned before the second protocol signals comprise the general second protocol transmit signal 75Tx, the general second protocol receive signal 75Rx. Without any limitation it is possible for the second port 11-2 to receive the individual second protocol transmit signals 75Tx-1, 75Tx-2, . . . , 75Tx-K and/or the general second protocol transmit signal 75Tx. It is also possible for the second port 11-2 to provide the individual second protocol first polarisation receive signals 75RxP1-1, 75RxP1-2, . . . , 75RxP1-J, the individual second protocol second polarisation receive signal 75RxP2-1, 75RxP2-2, . . . , 75RxP2-K and/or the general second protocol receive signal 75Rx, as shall be explained further down.

Figure 3:
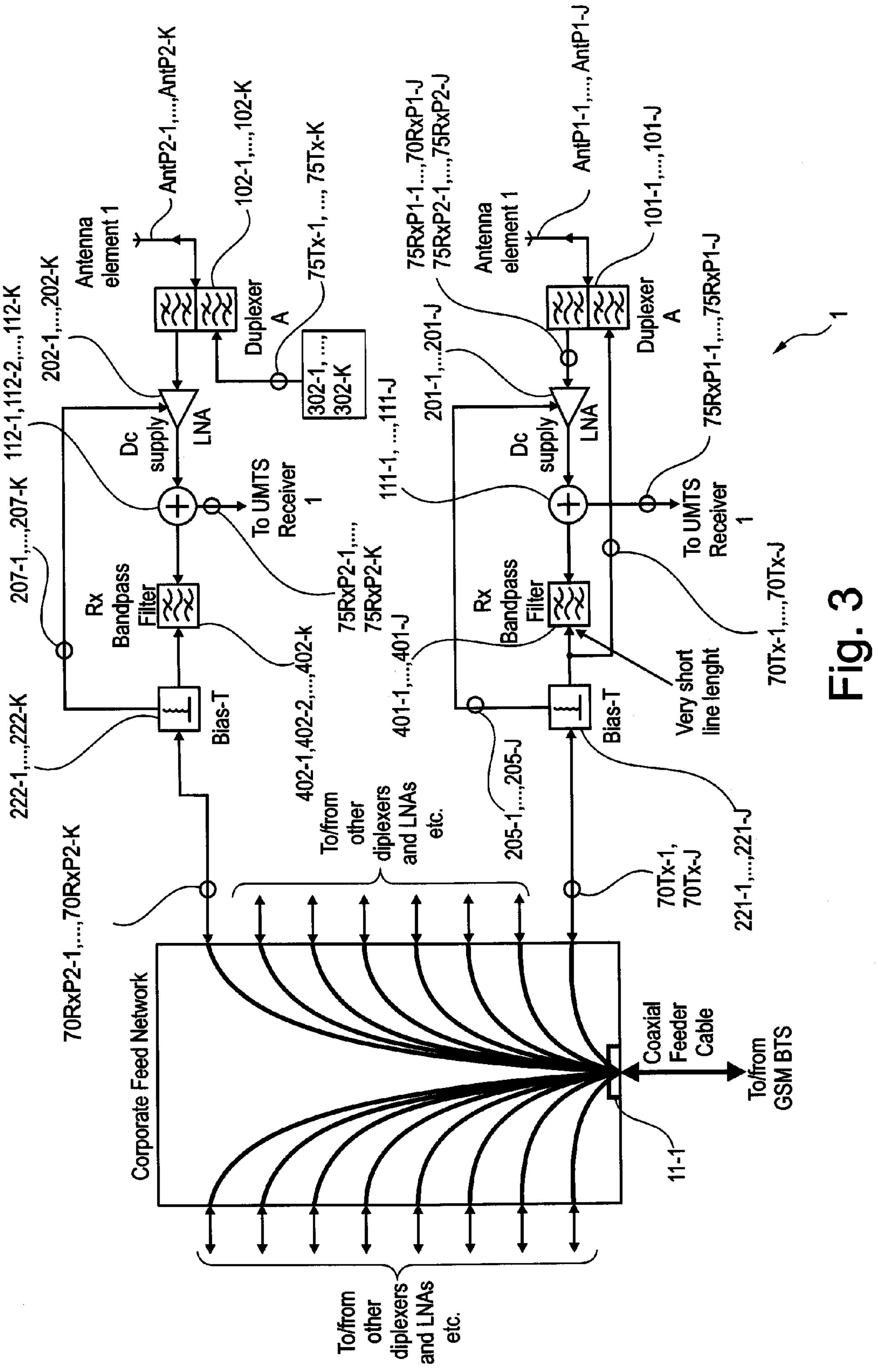
FIG. 3 shows details of the active antenna array for an individual one of the first polarisation and second polarisation antenna elements

The individual second protocol transmit signals 75Tx-1, 75Tx-2, . . . , 75Tx-K are forwarded to the individual one of the second polarisation antenna elements AntP2-1, AntP 2-2, . . . , AntP2-K (see FIG. 3). The receive signals are received using both the first polarisation and the second polarisation. The second protocol first polarisation receive signal 75RxP1-1, 75RxP1-2, . . . , 75RxP1-J is received using the first polarisation antenna elements AntP1-1, AntP 1-2, . . . , AntP1-J. The second protocol second polarisation receive signal 75RxP2-1, 75RxP2-2, . . . , 75RxP2-K is received using the second polarisation antenna elements AntP2-1, AntP2-2, . . . , AntP2-K. The second protocol receive signals of first and second polarisation are forwarded to the second port 11-2. The fibre-optic cable may carry the second protocol radio signals in an open base station architecture initiative (OBSAI) format or a common public radio initiative (CPRI) format or a public open baseband remote-radio-head interface (P-OBRI) format, but is not limited thereto. The fibre-optic cable ending at the second port 11-2 may be used to relay second protocol radio signals to and from active circuits within the active antenna array 1, as will be explained later. The fibre-optic cable may be replaced by any other suitable link and is only given as one example of a suitable link ending at the second port 11-2.

FIG. 3 shows details of the active antenna array 1 of the present disclosure.

FIG. 3 shows an example of the individual relay path terminated by the individual first polarisation antenna element AntP1-1, AntP1-2, . . . , AntP1-J in a lower half of the Figure. There may be more than one of the relay paths terminated by the first polarisation antenna element AntP1-1, AntP1-2, . . . , AntP1-J. In the upper half an example of the individual relay path terminated by the second polarisation antenna element AntP2-1, AntP2-2, . . . , AntP2-K is displayed. There may be more than one of the relay paths terminated by the second polarisation antenna elements AntP2-1, AntP2-2, . . . , AntP2-K. The individual first polarisation antenna element AntP1-1, AntP1-2, . . . , AntP1-J is used for relaying first protocol transmit signals 70Tx-1, 70Tx-2, . . . , 70Tx-J. The first protocol transmit signals 70Tx-1, 70Tx-2, . . . , 70Tx-J are transmitted by the individual first polarisation antenna elements AntP1-1, AntP1-2, . . . , AntP1-J. The individual first polarisation antenna element AntP1-1, AntP1-2, . . . , AntP1-J is adapted for receiving first protocol first polarisation receive signals 70RxP1-1, 70RxP1-2, . . . , 70RxP1-J and to receive second protocol first polarisation receive signals 75RxP1-1, 75RxP1-2, . . . , 75RxP1-J.

Let us consider a reception of the individual first polarisation antenna elements AntP1-1, AntP1-2, . . . , AntP1-J first. The first splitter 101-1, 101-2, . . . , 101-J splits first protocol first polarisation 70RxP1-1, 70RxP1-2, . . . , 70RxP1-J and second protocol first polarisation 75RxP1-1, 75RxP1-2, . . . , 75RxP1-J signals from the first protocol transmit signals 70Tx-1, 70Tx-2, . . . , 70Tx-J. The first splitter 101-1, 101-2, . . . , 101-J prevents any substantial portion of the first protocol transmit signal 70Tx-1, 70Tx-2, . . . , 70Tx-J from entering a first amplifier 201-1, 201-2, . . . , 201-J possibly causing damage to the first amplifier 201-1, 201-2, . . . , 201-J. The first splitter 101-1, 101-2, . . . , 101-J may be implemented as a duplexer, a quadrature hybrid, a directional coupler, a circulator but is not limited thereto. The first splitter 101-1, 101-2, . . . , 101-J substantially restricts any one of the first protocol first polarisation receive signals 75RxP1-1, 75RxP1-2, . . . , 75RxP1-J and the second protocol first polarisation receive signals 75RxP1-1, 75RxP1-2, . . . , 75RxP1-J from entering a transmit path reaching the first splitter 101-1, 101-2, . . . , 101-J. Any receive signals entering the transmit path will cause loss in signal strength of the individual first protocol first polarisation receive signal 70RxP1-1, 70RxP1-2, . . . , 70RxP1-J and/or the second protocol first polarisation receive signal 75RxP1-1, 75RxP1-2, . . . , 75RxP1-J reaching the first amplifier 201-1, 201-2, . . . , 201-J. The first splitter 101-1, 101-2, . . . , 101-J forwards the individual first protocol first polarisation receive signal 70RxP1-1, 70RxP1-2, . . . , 70RxP1-N and/or the individual second protocol first polarisation receive signal 75RxP1-1, 75RxP1-2, . . . , 75RxP1-N to the first amplifier 201-1, 201-2, . . . , 201-J downstream of the first splitter 101-1, 101-2, . . . , 101-J along the receive direction. The first amplifier 201-1, 201-2, . . . , 201-J amplifies the individual first protocol first polarisation receive signal 70RxP1-1, 70RxP1-2, . . . , 70RxP1-N and/or the individual second protocol first polarisation receive signal 75RxP1-1, 75RxP1-2, . . . , 75RxP1-N.

Figure 1:
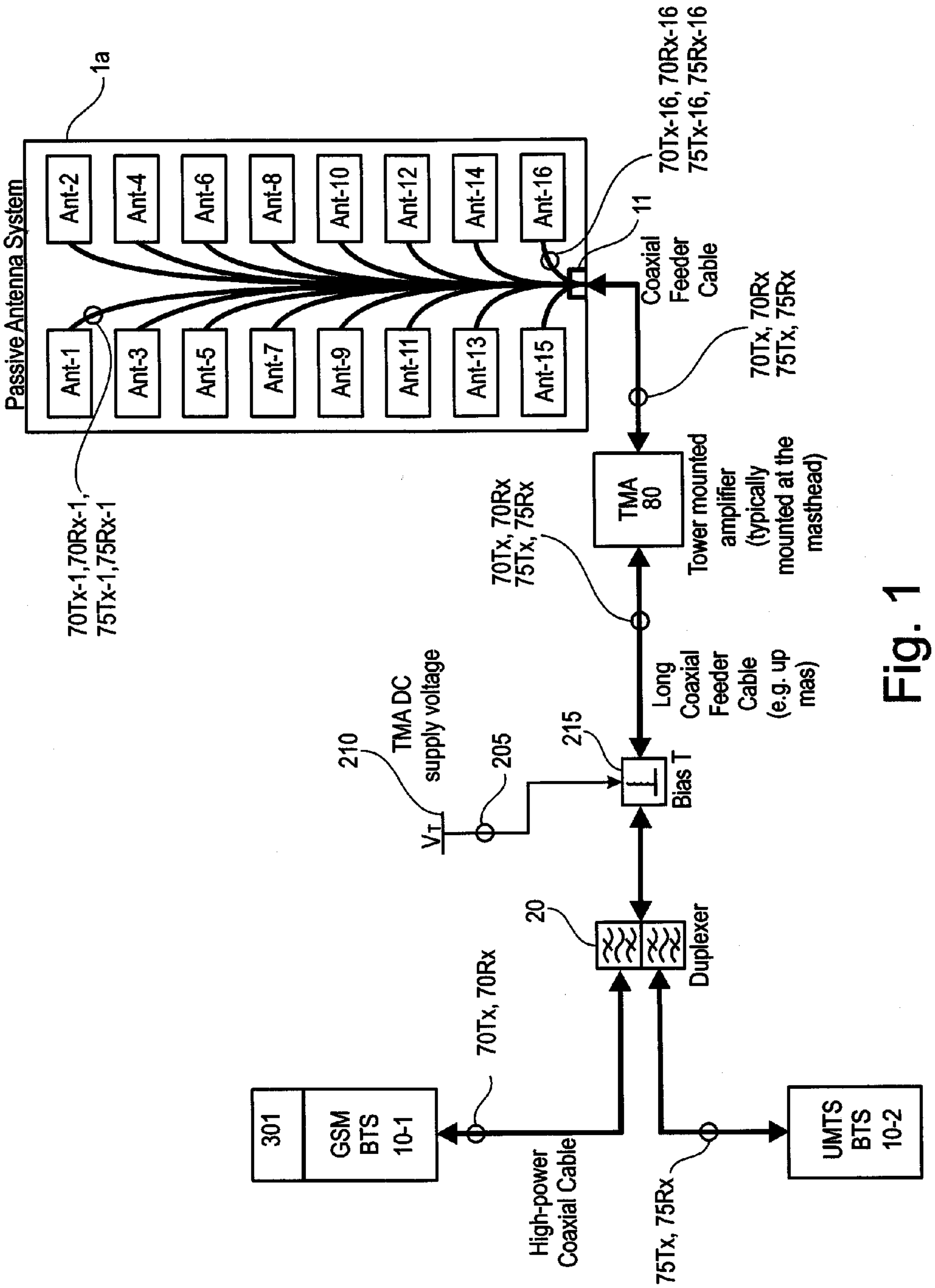
FIG. 1 shows an antenna array of the prior art

The first amplifier 201-1, 201-2, . . . , 201-J is provided with an individual first DC voltage 205-1, 205-2, . . . , 205-J. As known in the prior art the DC voltage adder 215 (see FIG. 1) may be used along the first protocol link (i.e. the coaxial feeder cable) to add the first DC voltage 205 to the first protocol link ending at the first port 11-1. The first DC voltage 205 provided by the first DC voltage supply 210 (FIG. 1) is split at the first port 11-1 providing the individual first DC voltage 205-1, 205-2, . . . , 205-N to one or more of the individual relay paths terminated by the individual first polarisation antenna element AntP1-1, AntP1-2, . . . , AntP1-J. The passive corporate feeder network from the first port 11-1 branching into individual relay paths will forward the individual first DC voltage 205-1, 205-2, . . . , 205-N to the individual relay paths terminated by the individual first polarisation antenna elements AntP1-1, AntP1-2, . . . , AntP1-J. A first DC voltage extractor 220-1, 220-2, . . . , 220-N extracts an individual DC voltage 205-1, 205-2, . . . , 205-N and provides the individual first DC voltage 205-1, 205-2, . . . 205-N to the first amplifier 201-1, 201-2, . . . , 201-J.

Using the DC voltage adder 215 and the first DC voltage extractor 221-1, 221-2, . . . , 221-J reduces an amount of required DC lines for supplying the first amplifiers 200-1, 200-2, . . . , 200-J. Otherwise an individual DC line carrying the individual first DC voltage 205-1, 205-2, . . . , 205-J to the first amplifier 201-1, 201-2, . . . , 201-J would be required. The individual DC lines would add to the cost of the active antenna array 1. Furthermore the individual first DC lines will be susceptible to any RF signals impinging on the individual first DC lines and possibly thereby causing distortion or unwanted signal generation in the individual ones of the first amplifiers 201-1, 201-2, . . . , 201-J. Furthermore when using several individual DC lines it may prove difficult to assure a common ground for all the individual first DC lines; hence causing unwanted ground loops. The unwanted ground loops may receive an RF signal from radio signals relayed by the active antenna system 1. Therefore the individual first DC voltage 205-1, 205-2, . . . , 205-J supplying the first amplifier 201-1, 201-2, . . . , 201-J may be substantially distorted by the RF signals received by the first DC lines, which may possibly cause the first amplifier 201-1, 201-2, . . . , 201-J to stop working or to generate unwanted spurious signals.

A first coupler 111-1, 111-2, . . . , 111-J splits the individual first protocol first polarisation receive signal 70RxP1-1, 70RxP1-2, . . . , 70RxP1-J and/or the individual second protocol first polarisation receive signal 75RxP1-1, 75RxP1-2, . . . , 75RxP1-J into two paths. A first path goes to a first receive filtering element 401-1, 401-2, . . . , 401-J. The second path goes from the first coupler 111-1, 111-2, . . . , 111-J to a second protocol receiver for the individual one of the first polarisation antenna element AntP1-1, AntP1-2, . . . , AntP1-J. There may be an individual second protocol receiver for one or more of the first polarisation antenna elements AntP1-1, AntP1-2, . . . , AntP1-J. Alternatively, the second protocol receiver may comprise an individual second protocol receiver for one or more of the individual second protocol first polarisation receive signals 75RxP1-1, 75RxP1-2, . . . , 75RxP1-J.

It is further conceivable that the second protocol receiver is implemented as a second protocol transceiver. The second protocol transceiver may comprise an individual second protocol receiver for each one of the individual second protocol first polarisation receive signals 75RxP1-1, 75RxP1-2, . . . , 75RxP1-J. Alternatively, the second protocol transceiver may be implemented comprising a receiver for two or more of the individual second protocol receive signals 75Rx-1, 75Rx-2, . . . , 75Rx-N.

The second protocol transceiver provides at least one of the individual second protocol transmit signals 75Tx-1, 75Tx-2, . . . , 75Tx-N as shall be discussed further down.

The first path reaches the first receive filtering element 401-1, 401-2, . . . , 401-J, with the individual first protocol first polarisation receive signals 70RxP1-1, 70RxP1-2, . . . ,

70RxP1-J traversing it and going on to be combined by the passive corporate feeder network or the passive feeder cable providing the general first protocol receive signal 70Rx at the first protocol link connected to the first port 11-1. The first receive filtering element 401-1, 401-2, . . . , 401-J substantially removes any components of the first protocol transmit signal 70Tx-1, 70Tx-2, . . . , 70Tx-J which would otherwise impinge upon the output of the first amplifier 201-1, 201-2, . . . , 201-J, thereby causing unwanted distortion in the said amplifier or possible damage to it. The first receive filtering element 401-1, 401-2, . . . , 401-J may comprise a filter element or alternatively a duplexer, a circulator, a directional coupler, or a quadrature hybrid, as already mentioned for the first splitter 100*a*-1, 100*a*-2, . . . , 100*a*-N.

The second signal path goes from the first coupler 111-1, 111-2, . . . , 111-J to the respective second protocol receiver. The individual first protocol first polarisation receive signals 75RxP1-1, 75RxP1-2, . . . , 75RxP1-J may require a filtering to remove or at least attenuate components of the first protocol first polarisation receive signal 70RxP1-1, 70RxP1-2, . . . , 70RxP1-J. Filters adapted for this filtering are known in the art and not shown in FIG. 3.

The active antenna array 1 of the present disclosure is described in FIG. 3 using an example of an active transmit and receive antenna array 1. It is conceivable for the active antenna array 1 to comprise only a receive functionality. For a receive only aspect of the active antenna array 1, there will be no radio signals transmitted by the active antenna array 1, as will be described next.

A general first protocol transmit signal 70Tx is forwarded by the first protocol link (i.e. coaxial feeder cable) to the first port 11-1 and split into individual first protocol transmit signals 75Tx-1, 75Tx-2, . . . , 75Tx-J by the passive corporate feeder network and relayed by the individual first polarisation antenna elements AntP1-1, AntP1-2, . . . , AntP1-J. The passive corporate feeder network provides a 1:M relation between the general first protocol transmit signal 70Tx to the individual first polarisation antenna elements AntP1-1, AntP1-2, . . . , AntP1-J. M may be greater than one in the active antenna array 1. M may further match a number J of the first polarisation antenna elements AntP1-1, AntP1-2, . . . , AntP1-J present in the active antenna array 1 or any other positive integer value.

It will be noted that the individual first protocol transmit signal 70Tx-1, 70Tx-2, . . . , 70Tx-J is only shown for an individual one of the first polarisation antenna elements AntP1-1, AntP1-2, . . . , AntP1-J. For each one of the first polarisation antenna elements AntP1-1, AntP1-2, . . . , AntP1-J a corresponding arrangement may be used. The individual first protocol transmit signal 70Tx-1, 70Tx-2, . . . , 70Tx-J is forwarded from the corporate feeder network passing the first DC voltage extractor 221-1, 221-2, . . . , 221-J and impinges on the first receive filtering element 401-1, 401-2, . . . , 401-J. Close to the first receive filtering element 401-1, 401-2, . . . , 401-J the transmit line is tapped off forwarding the first protocol transmit signal 70Tx-1, 70Tx-2, . . . , 70Tx-J to the first splitter 101-1, 101-2, . . . , 101-J. The first splitter 101-1, 101-2, . . . , 101-J will forward the individual first protocol transmit signal 70Tx-1, 70Tx-2, . . . , 70Tx-J to the individual first polarisation antenna element AntP1-1, AntP1-2, . . . , AntP1-J. The first receive filtering element 401-1, 401-2, . . . , 401-J will attenuate the first protocol transmit signal 70Tx-1, 70Tx-2, . . . , 70Tx-J as the first protocol transmit signal 70Tx-1, 70Tx-2, . . . , 70Tx-J lies in a stop band of the first receive filtering element 401-1, 401-2, . . . , 401-J. Most of the first protocol transmit signals 70Tx-1, 70Tx-2, . . . , 70Tx-J will travel to the first splitter 101-1, 101-2, . . . , 101-J. In the two cross referenced applications to the present disclosure, the first protocol transmit signal 70Tx-1, 70Tx-2, . . . , 70Tx-J was combined with the second protocol transmit signal 75Tx-1, 75Tx-2, . . . , 75Tx-K of a second protocol transmitter, such as a UMTS transmitter, using a second combiner element 110*b*. The combiner element could be formed in several ways, for example a filter-combiner having a low loss but at the same time being expensive, inflexible and wasteful with respect to spectrum requirements, a hybrid combiner or a Wilkinson combiner. The hybrid combiner and the Wilkinson combiner would have higher probably unacceptable loss which in some cases can not be tolerated.

The first protocol transmit signals 70Tx-1, 70Tx-2, . . . , 70Tx-J will almost entirely head towards the first splitter 101-1, 101-2, . . . , 101-J, if out-of-band characteristics of the first receive filtering element 401-1, 401-2, . . . , 401-J (typically implemented as a bandpass) present a high impedance to the individual first protocol transmit signals 70Tx-1, 70Tx-2, . . . , 70Tx-J and a distance between the tap-off point and the first splitter 101-1, 101-2, . . . , 101-J is electrically short (say less than one tenth of a wavelength of the first protocol transmit signals, or less). It is straightforward to arrange for both of these criteria to be fulfilled in practice and so the first protocol transmit signals 70Tx-1, 70Tx-2, . . . , 70Tx-J will find their way to the first polarisation antenna elements AntP1-1, AntP1-2, . . . , AntP1-J with virtually no (added) loss. It may be of interest to add an isolator (not shown) immediately to the left of the tap-off point. The isolator may help preventing reflections in case the distance between the tap-off point and the first splitter 101-1, 101-2, . . . , 101-J is not electrically short. Such a scenario may occur at very high carrier frequencies where it may be difficult to make the distance between the tap-off point and the first splitter 101-1, 101-2, . . . , 101-J, electrically short. The first splitter 101-1, 101-2, . . . , 101-J substantially attenuates any first protocol transmit signal 70Tx-1, 70Tx-2, . . . , 70Tx-J that might reach the first amplifier 201-1, 201-2, . . . , 201-J, possibly causing damage to the first amplifier 201-1, 201-2, . . . , 201-J.

Let us now consider the relay path terminated by the individual second polarisation antenna element AntP2-1, AntP2-2, . . . , AntP2-K. It is to be noted that the individual second polarisation antenna element AntP2-1, AntP2-2, . . . , AntP2-K is used for transmitting second protocol transmit signals 75Tx-1, 75Tx-2, . . . , 75Tx-K as well as for a reception of a first protocol second polarisation receive signal 70RxP2-1, 70RxP2-2, . . . , 70RxP2-K and a second protocol second polarisation receive signal 75RxP2-1, 75RxP2-2, . . . , 75RxP2-K. Therefore there will be more antenna elements used for a receiving of receive signals than are used for a transmitting of the transmit signals. In the cross referenced applications the number of antenna elements used for the transmitting and the number of antenna elements used for a receiving was identical. A second splitter 102-1, 102-2, . . . , 102-K downstream of the second polarisation antenna element AntP2-1, AntP2-2, . . . , AntP2-K forwards the individual first protocol second polarisation receive signal 70RxP2-1, 70RxP2-2, . . . , 70RxP2-K and the second protocol second polarisation receive signal 75RxP2-1, 75RxP2-2, . . . , 75RxP2-K to a second amplifier 202-1, 202-2, . . . , 202-K. A second DC voltage extractor 222-1, 222-2, . . . , 222-K is used for extracting a second individual DC voltage 207-1, 207-2, . . . , 207-K supplying the second amplifier 202-1, 202-2, . . . , 202-K as explained for the first amplifier 201-1, 201-2, . . . , 201-J. A second coupler 112-1, 112-2, . . . , 112-K arranged downstream of the second amplifier 202-1, 202-2, . . . , 202-K splits the individual relay path terminated by the second polarisation antenna element AntP2-1, AntP2-2, . . . , AntP2-K in a first path and a second path in the receive direction. The second path from the second coupler 112-1, 112-2, . . . , 112-K to a second protocol receiver 302-1, 302-2, 302-K forwards the second protocol second polarisation receive signals 75RxP2-1, 75RxP2-2, . . . , 75RxP2-K to the second protocol receiver 302-1, 302-2, . . . , 302-K. The second receive filtering element 402-1, 402-2, . . . , 402-K will have a pass band forwarding any one of the first protocol receive signals and/or the second protocol receive signals. A stop band of the second receive filtering element 402-1, 402-2, . . . , 402-K is designed to substantially attenuate the first protocol transmit signals 70Tx-1, 70Tx-2, . . . , 70Tx-J thus protecting the second amplifier 202-1, 202-2, . . . , 202-K from any damage and/or distortion due to transmit signals impinging thereupon.

The individual first protocol second polarisation receive signal 70RxP2-1, 70RxP2-2, . . . , 70RxP2-K is forwarded to the corporate feed network reaching the first port 11-1. At the first port 11-1 the first protocol first polarisation receive signal 70RxP1-1, 70RxP1-2, . . . , 70RxP1-J and the first protocol second polarisation receive signal 70RxP2-1, 70RxP2-2, . . . , 70RxP2-K will be combined to form the general first protocol receive signal 70Rx. This combination at the first port 11-1 is also valid if there should be an unequal number of first polarisation antenna elements J and second polarisation antenna elements K. In case of the unequal number J and K one of the first and second polarisation receive signals will be overrepresented in the general first protocol receive signal 70Rx.

For the sake of clarity it is to be noted that the second polarisation antenna element AntP2-1, AntP2-2, . . . , AntP2-K transmits only second protocol transmit signals 75Tx-1, 75Tx-2, . . . , 75Tx-K. Therefore it is sufficient to connect an output of a second protocol transmitter (not shown) to an input of the second splitter 102-1, 102-2, . . . , 102-K forwarding the second protocol transmit signal 75Tx-1, 75Tx-2, . . . , 75Tx-K to the second polarisation antenna elements AntP2-1, AntP2-2, . . . , AntP2-K. The second splitter 102-1, 102-2, . . . , 102-K substantially attenuates any of the second protocol transmit signals 75Tx-1, 75Tx-2, . . . , 75Tx-K to leaking into the receive path reaching the second amplifier 202-1, 202-2, . . . , 202-K, possibly causing damage and/or distortion to the second amplifier. As for the first splitter 101-1, 101-2, . . . , 101-J the second splitter 102-1, 102-2, . . . , 102-K further substantially hinders a portion of the first protocol second polarisation receive signals 70RxP2-1, 70RxP2-2, . . . , 70RxP2-K and the second protocol second polarisation receive signal 75RxP2-1, 75RxP2-2, . . . , 75RxP2-K from reaching the second protocol transmitter (shown as the second protocol generator 302-1, 302-2, . . . , 302-K in FIG. 3), thus causing loss in receive signal strength.

Figure 4:
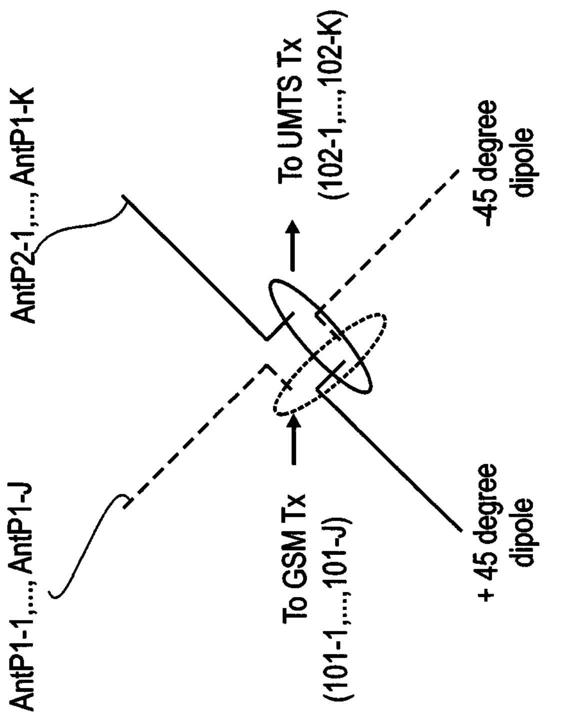
FIG. 4 shows details of the active antenna elements

FIG. 4 shows a known arrangement of dipole antennas for generating +45 and −45 degree polarisations. The first polarisation antenna element providing, for example, a −45 degree polarisation, is shown hatched representing an example of the first polarisation antenna element AntP1-1, AntP1-2, . . . , AntP1-J together with a feed for the +45 degree polarisation connected to the first splitter 101-1, 101-2, . . . , 101-J. An example of a dipole antenna representing the individual second polarisation antenna element AntP2-1, AntP2-2, . . . , AntP2-K is shown as solid black line together with a feed for the +45 degree dipole connected to the second splitter 102-1, 102-2, . . . , 102-K.

It will be noted that a use of +45 and −45 degree is a selection of convenience only and not limiting to the present disclosure. As an alternative example, it is possible to utilise 'right-hand' and 'left-hand' circular polarisations. It is sufficient that the first polarisation and the second polarisation are substantially orthogonal.

One potential issue with the active antenna array 1 shown in FIG. 3 is an occurrence of reflections on the relay path from tap-off point between the first DC voltage extractor 221-1, 221-2, . . . , 221-J and the first receive filtering element 401-1, 401-2, . . . , 401-J reaching the first splitter 101-1, 101-2, . . . , 101-J. The relay path may be of a substantial length since it is "bypassing" a number of components: the first filtering element 401-1, 401-2, . . . , 401-J, the first coupler 111-1, 111-2, . . . , 111-J, and the first amplifier 201-1, 201-2, . . . , 201-J as indicated in FIG. 3. Therefore there is a potential of the receive-band signals leaving the first receive filtering element 401-1, 401-2, . . . , 401-J to propagate towards the first splitter 101-1, 101-2, . . . , 101-J. Receive signals will appear in a stop band of the first splitter 101-1, 101-2, . . . , 101-J and will therefore be reflected. Any receive signals reflected by the first splitter 101-1, 101-2, . . . , 101-J will re-combine with the wanted first protocol first polarisation receive signals 70RxP1-1, 70RxP1-2, . . . , 70RxP1-J between the first DC voltage extractor 221-1, 221-2, . . . , 221-J and the first receive filtering unit 401-1, 401-2, . . . , 401-J. In consequence constructive and destructive interference will appear for the first protocol first polarisation receive signals 70RxP1-1, 70RxP1-2, . . . , 70RxP1-J. The resulting signal, combined with the first protocol receive signal will have a modified phase (at least and possibly also a modified amplitude). Furthermore the modified phase and the modified amplitude are likely to vary with frequency across the pass band of the first receive filtering element 401-1, 401-2, . . . , 401-J. An unknown set of phases and possibly even unknown amplitudes for the first protocol first polarisation receive signals 70RxP1-1, 70RxP1-2, . . . , 70RxP1-J will enter the corporate feed network for the individual first polarisation antenna elements AntP1-1, AntP1-2, . . . , AntP1-J. The reflections will cause an unknown beam-shape, tilt angle and the like for the first protocol first polarisation receive signals 70RxP1-1, 70RxP1-2, . . . , 70RxP1-J; as the first splitter 101-1, 101-2, . . . , 101-J are unlikely to be identical, in terms of stop-band characteristics for all the receive paths terminated by the first polarisation antenna elements AntP1-1, AntP1-2, . . . , AntP1-J.

Figure 5:
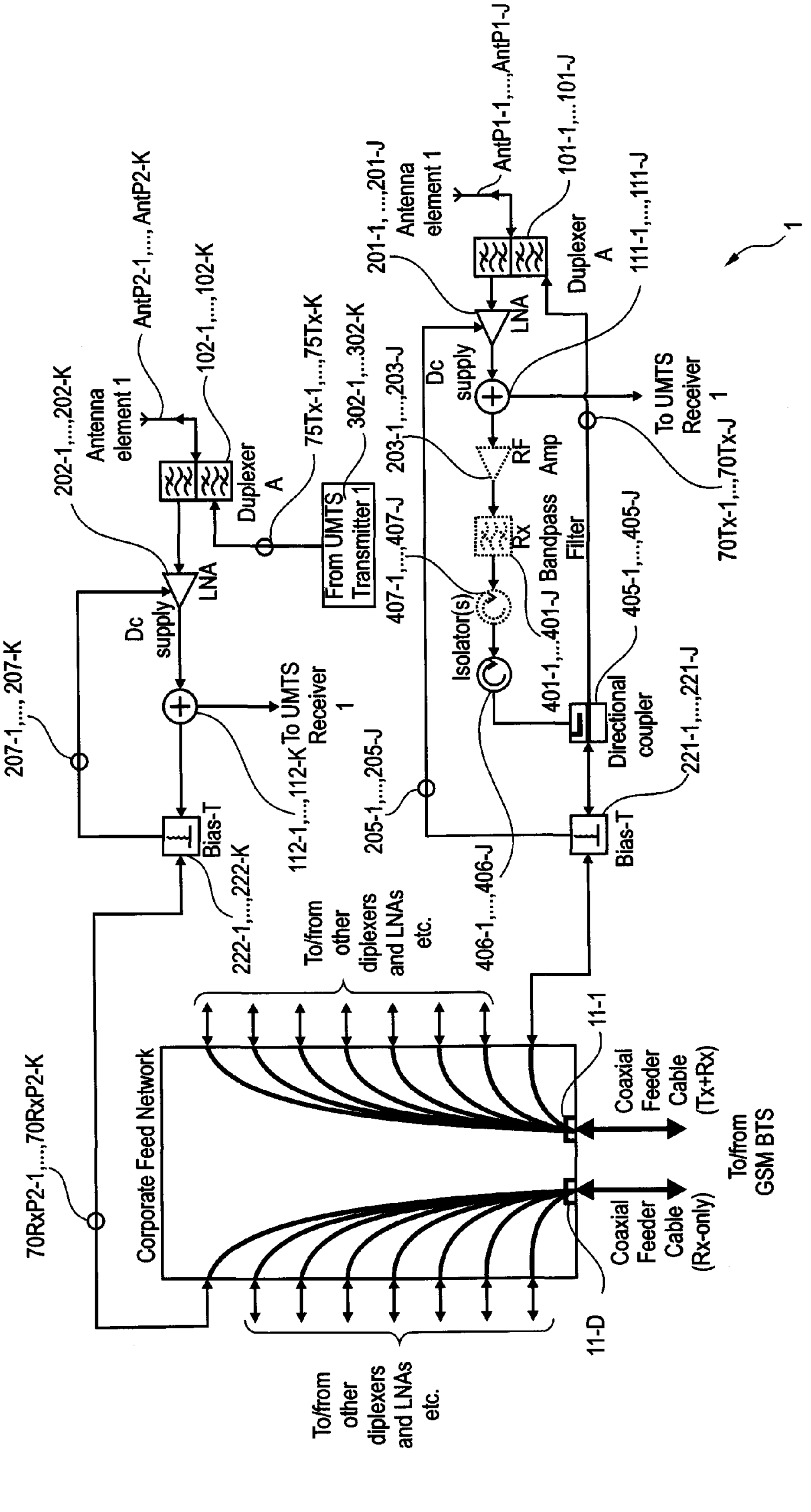
FIG. 5 shows an aspect of the active antenna array

FIG. 5 shows an aspect of the active antenna array 1 according to the present disclosure preventing the reflections of the first protocol receive signals as discussed above and also incorporating diversity receive capability for the first protocol receive signals, through the use of two RF ports; the first port 11-1 and a diversity port 11-D each fed by its own separate corporate feed network. The directional junction 405-1, 405-2, . . . , 405-J is disposed in the relay path terminated by the first polarisation antenna element AntP1-1, AntP1-2, . . . , AntP1-J. The directional junction 405-1, 405-2, . . . , 405-J replaces the tap-off point discussed with respect to FIG. 3. The individual first protocol transmit signal 70Tx-1, 70Tx-2, . . . , 70Tx-J enters the directional junction 405-1, 405-2, . . . , 405-J from the left to the right. For two ports of the directional junction 405-1, 405-2, . . . , 405-J there is substantially no loss or only very little loss for signals travelling between these two ports in a given direction. In FIG. 5 the connection with low loss is from a left to a right so that the first protocol transmit signals can pass the directional junction 405-1, 405-2, . . . , 405-J from the left to the right substantially un-attenuated. The directional junction 405-1, 405-2, . . . , 405-J is, for example, implemented as a directional coupler biased against the connection from the left to the right. Any signals travelling from the direction left to right, as do the first protocol transmit signals 70Tx-1, 70Tx-2, . . . , 70Tx-J, and attempting to exit via the coupled port (upper port of directional junction 405-1, 405-2, . . . , 405-J) will be substantially attenuated, for example by 15 dB or even more.

The first protocol first polarisation receive signals 75RxP1-1, 75RxP1-2, . . . , 75RxP1-J enter the directional junction 405-1, 405-2, . . . , 405-J from the upper port of the directional junction 405-1, 405-2, . . . , 405-J. Only a small fraction of the small first protocol first polarisation receive signals 75RxP1-1, 75RxP1-2, . . . , 75RxP1-J will reach the first splitter 101-1, 101-2, . . . , 101-J and cause interference due to the reflection at the first splitter 101-1, 101-2, . . . , 101-J. With the directional junction 405-1, 405-2, . . . , 405-J implemented as the directional coupler biased against the transmit direction, a first directional unit 406-1, 406-2, . . . , 406-J is present in order to substantially attenuate any remaining portion of the first protocol transmit signals 70Tx-1, 70Tx-2, . . . , 70Tx-J leaving the directional junction 405-1, 405-2, . . . , 405-J at the upper port. The first directional unit 406-1, 406-2, . . . , 406-J may be implemented as an isolator but is not limited thereto. In a through direction, indicated by an arrow, the directional unit 406-1, 406-2, . . . , 406-J will only cause a normal (small) attenuation. The first directional unit 406-1, 406-2, . . . , 406-J helps in attenuating any reflections of the first protocol first polarisation receive signals 70RxP1-1, 70RxP1-2, . . . , 70RxP1-J leaving the directional junction 405-1, 405-2, . . . , 405-J at the upper port and also in further attenuating any remaining portion of the first protocol transmit signals 70Tx-1, 70Tx-2, . . . , 70Tx-J leaving the directional junction 405-1, 405-2, . . . , 405-J at the upper port.

In FIG. 5 there is an auxiliary amplifier 203-1, 203-2, . . . , 203-J provided downstream of the first coupler 111-1, 111-2, . . . , 111-J. The auxiliary amplifier 203-1, 203-2, . . . , 203-J helps to overcome the additional attenuation introduced by an insertion loss of the directional unit 406-1, 406-2, . . . , 406-J and also the additional attenuation introduced by an insertion loss of the first coupler 111-1, 111-2, . . . , 111-J. There may be without any limitation a second directional unit 407-1, 407-2, . . . , 407-J provided. The first receive filtering element 401-1, 401-2, . . . , 401-J is shown dotted in the Figure to illustrate that the first receive filtering element 401-1, 401-2, . . . , 401-J is optional. The first receive filtering element 401-1, 401-2, . . . , 401-J may be omitted provided that first protocol polarisation transmit signals 70RxP1-1, 70RxP1-2, . . . , 70RxP1-J are sufficiently attenuated by at least one of the directional junction 405-1, 405-2, . . . , 405-J, directional unit 406-1, 406-2, . . . , 406-J or the second directional unit 407-1, 407-2, . . . , 407-J.

It will be noted that FIG. 5 incorporates another significant (optional) difference to the active antenna array 1 of FIG. 3. The active antenna array 1 of FIG. 5 makes use of two coaxial feed networks, which often exist at BTS sites for diversity provision. A second corporate feed network starts at a diversity port 11-D branching out into individual ones of the relay paths. The relay paths are terminated by the second polarisation antenna elements AntP2-1, AntP2-2, . . . , AntP2-K. In connection with the diversity port 11-D the second polarisation antenna elements AntP2-1, AntP2-2, . . . , AntP2-K are only used for reception of both first protocol second polarisation receive signals 70RxP2-1, 70RxP2-2, . . . , 70RxP2-K and second protocol second polarisation receive signals 75RxP2-1, 75RxP2-2, . . . , 75RxP2-K. If the second corporate feed is used as shown, the second receive filtering element 402-1, 402-2, . . . , 402-K can be eliminated, since no first protocol transmit signal will reach this portion of the relay path terminated by the second polarisation antenna element AntP2-1, AntP2-2, . . . , AntP2-K.

Therefore the second amplifier 202-1, 202-2, . . . , 202-K will not require protection from the first protocol transmit signal 70Tx-1, 70Tx-2, . . . , 70Tx-J. The first receive filtering element 401-1, 401-2, . . . , 401-J in the relay path terminated by the first polarisation antenna element AntP1-1, AntP1-2, . . . , AntP1-J could also be eliminated, since the directional junction 405-1, 405-2, . . . , 405-J and the directional units 406-1, 406-2, . . . , 406-J, and 407-1, 407-2, . . . , 407-J provide significant attenuation to the first protocol transmit signals 70Tx-1, 70Tx-2, . . . , 70Tx-J (perhaps 20 dB from the directional junction 405-1, 405-2, . . . , 405-J and 15 dB for each of the directional units 406-1, 406-2, . . . , 406-J, 407-1, 407-2, . . . , 407-J). It will be noted that the directional units 406-1, 406-2, . . . , 406-J and the second directional unit 407-1, 407-2, . . . , 407-J need only to be low power devices, since they are not required to pass high-power first protocol transmit signals 70Tx-1, 70Tx-2, . . . , 70Tx-J. Therefore the directional units 406-1, 406-2, . . . , 406-J, 407-1, 407-2, . . . , 407-J will be low in cost.

Figure 6:
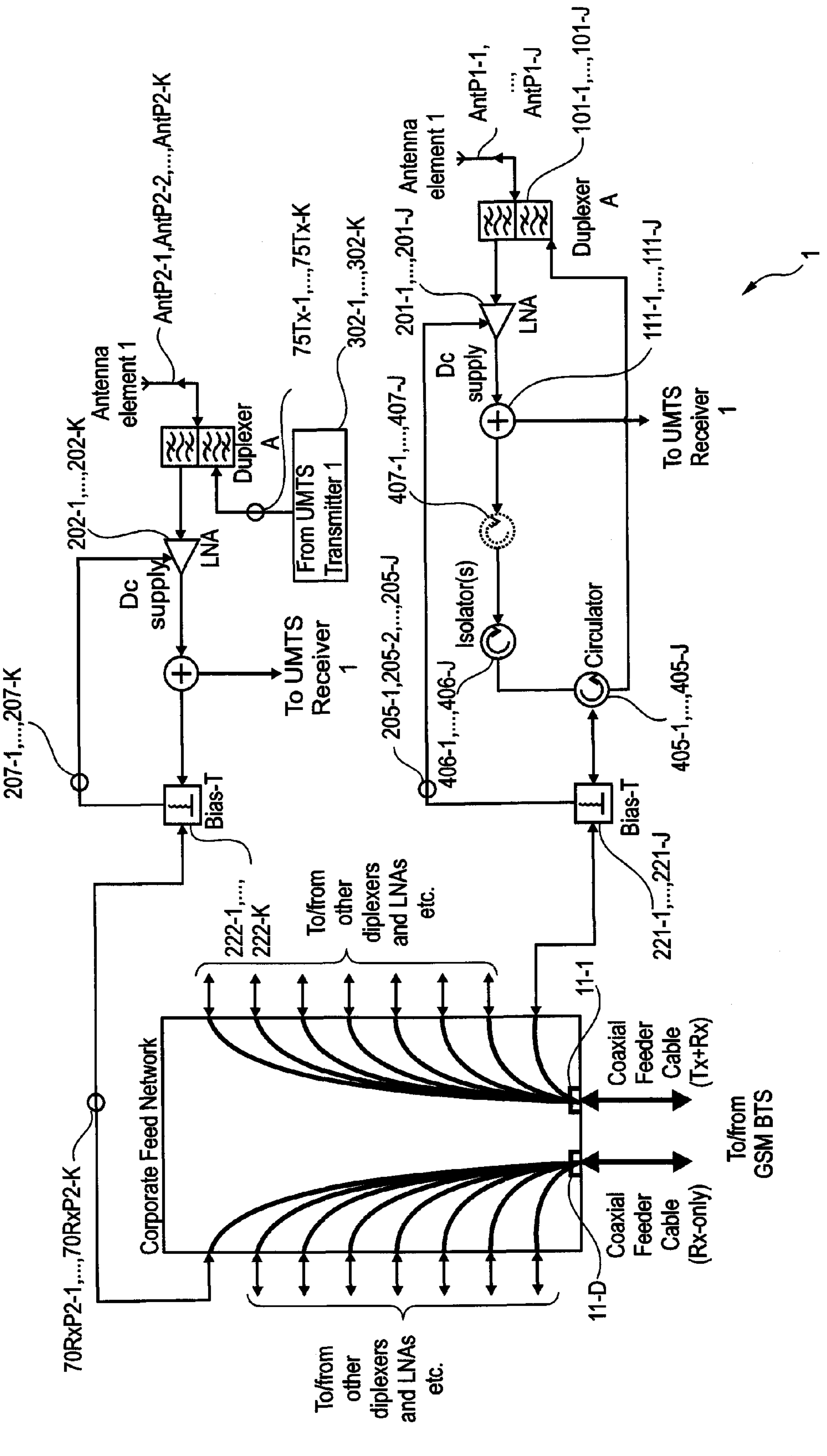
FIG. 6 shows a further aspect of the active antenna array

FIG. 6 shows an aspect of the active antenna array 1. In FIG. 6 the directional junction 405-1, 405-2, . . . , 405-J is implemented as a circulator. It is an advantage of the circulator to significantly reduce the losses in the receive path for the first protocol first polarisation receive signals 70RxP1-1, 70RxP1-2, . . . , 70RxP1-J. Therefore a need for the auxiliary amplifier 203-1, 203-2, . . . , 203-J (FIG. 5) may be removed. As a trade off the circulator needs to handle the full power of the first protocol transmit signals (for example a few watts in total) and needs to be sufficiently linear in its transfer function in order to meet adjacent channel requirements given by the first protocol, such as the GSM protocol. The linearity requirement may increase the cost of implementing the directional junction 405-1, 405-2, . . . , 405-J as a circulator.

Figure 7:
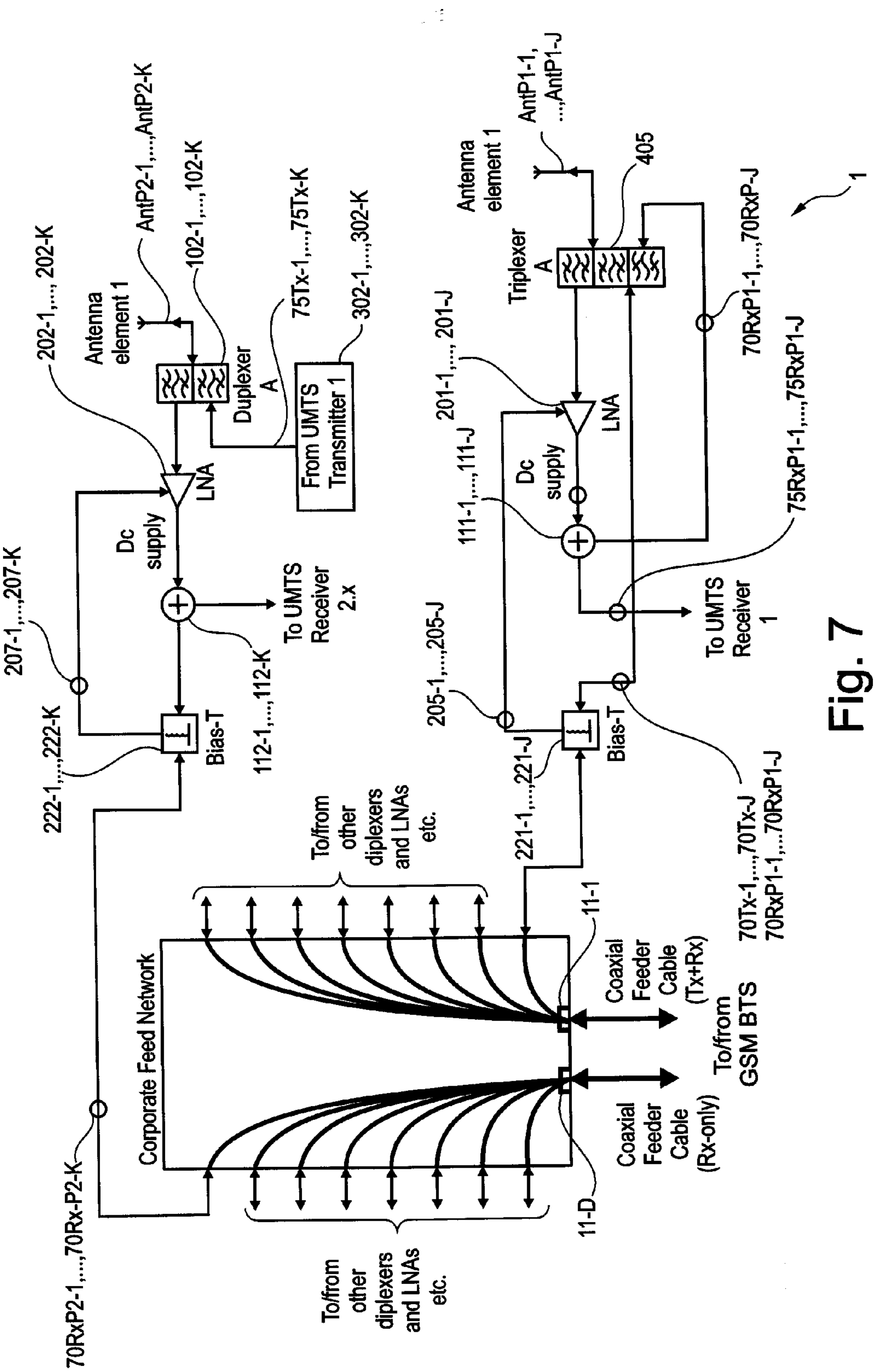
FIG. 7 shows yet anther aspect of the active antenna array

FIG. 7 shows a further alternative of the active antenna array 1 as shown in FIG. 3. In FIG. 7 the directional junction 405-1, 405-2, . . . , 405-J is implemented as a triplexer in order to eliminate the reflections in the receive direction and to prevent the constructive/destructive interference, as discussed above. Using the triplexer does in term add significantly to a complexity of a front-end filtering part of the active antenna 1, which is undesirable.

Figure 8:
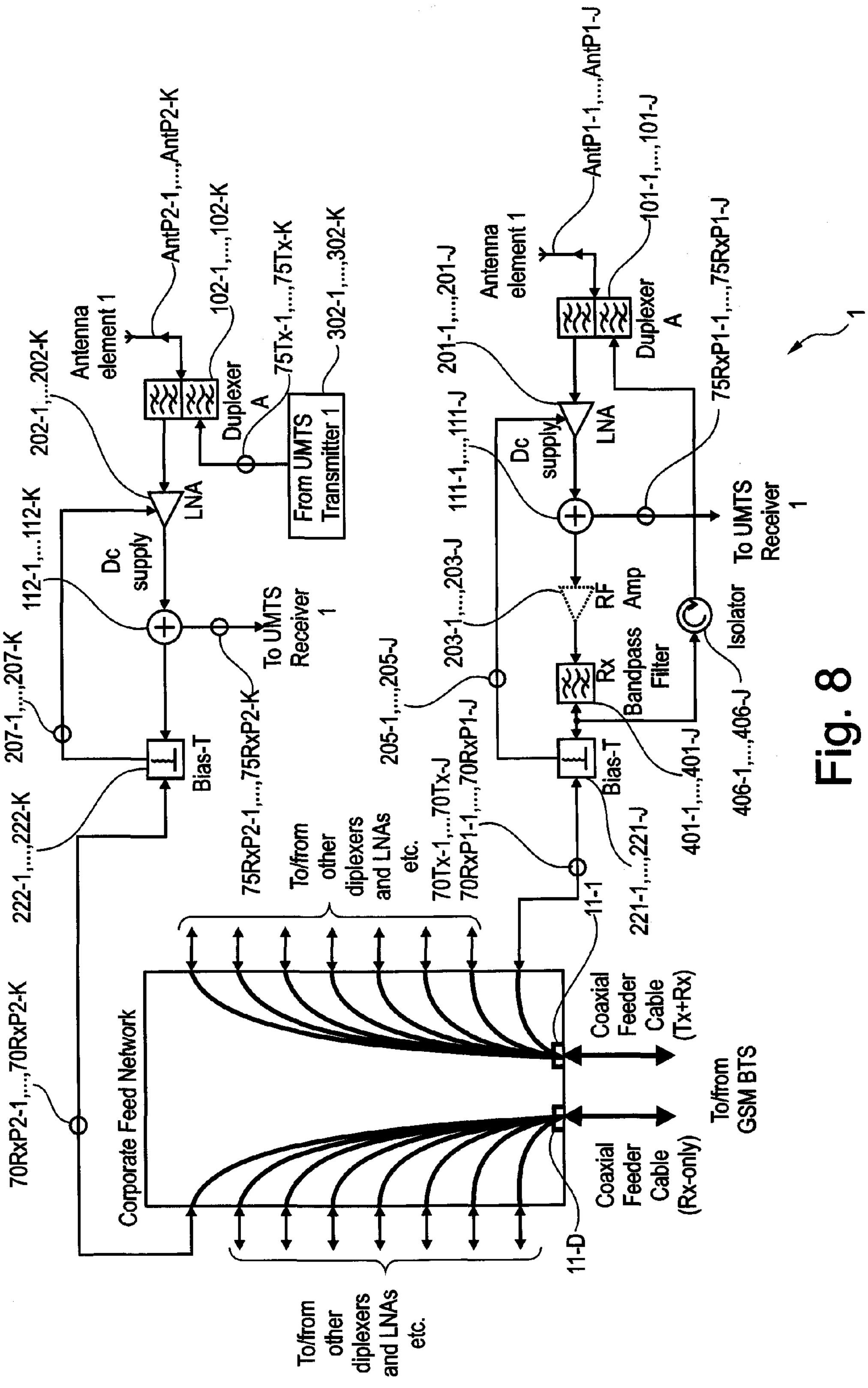
FIG. 8 shows another variant of the active antenna array

FIG. 8 shows a further alternative of the active antenna array 1 as shown in FIG. 3 in order to suppress unwanted reflections by implementing a directional unit 406-1, 406-2, . . . , 406-J in the transmit path between the tap-off point and the first splitter 101-1, 101-2, . . . , 101-J. The directional unit 406-1, 406-2, . . . , 406-J implemented as an isolator needs to handle the first protocol transmit power and needs to achieve the linearity specifications of the first transmit protocol. In return the isolator has the advantage that an isolation performance of the isolator is less sensitive to terminating impedances as for the circulator based solution discussed with respect to FIG. 6.

Figure 9:
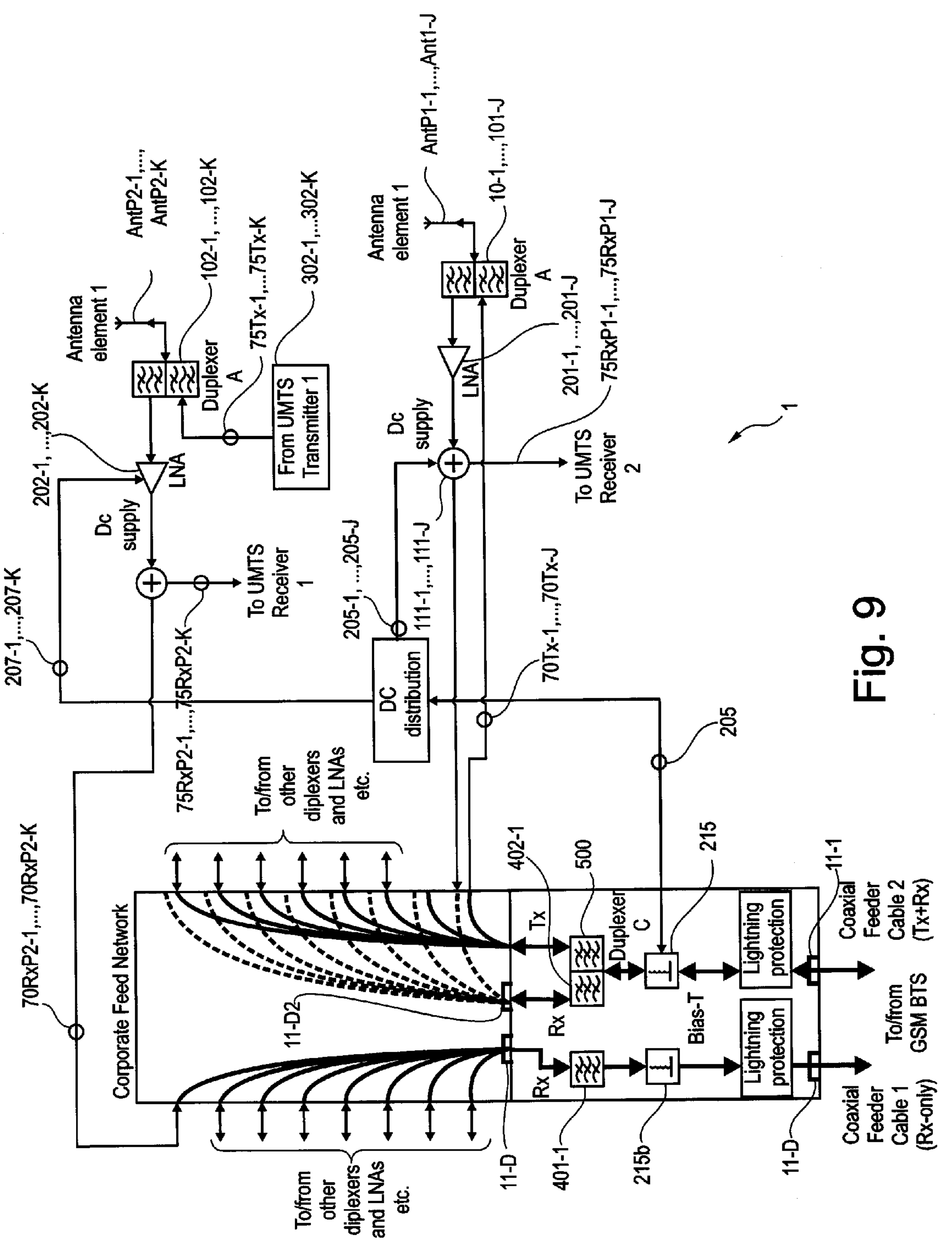
FIG. 9 shows yet another aspect of the active antenna array

FIG. 9 shows yet another aspect of the active antenna array 1. Between the first port 11-1 and the corporate feed network there is a general splitter 500. The general splitter 500 may be implemented as a duplexer but is not limited thereto. The general splitter 500 separates first protocol transmit signals 70Tx-1, 70Tx-2, . . . , 70Tx-J from first protocol receive signals comprising first protocol first polarisation receive signals 70RxP1-1, 70RxP1-2, . . . , 70RxP1-J. The first protocol first polarisation receive signals 70RxP1-1, 70RxP1-2, . . . , 70RxP1-J are forwarded to a common receive feeder network shown as dotted black lines. The common receive feeder network ends at a second diversity port 11-D2. First protocol transmit signals 70Tx-1, 70Tx-2, . . . , 70Tx-J travel along the common feeder network as in the aspects described before.

Further the relay paths terminated by the second polarisation antenna elements AntP2-1, AntP2-2, . . . , AntP2-K are connected to the diversity feeder network ending at the diversity port 11-D, as already discussed with respect to FIG. 8. The first DC voltage extractor 215 extracts a general DC voltage 205 being forwarded to a DC distribution unit. The DC distribution unit provides the first individual DC voltage 205-1, 205-2, . . . , 205-J and the second individual DC voltage 207-1, 207-2, . . . , 207-K to the first amplifier 201-1, 201-2, . . . , 201-J and the second amplifier 202-1, 202-2, . . . , 202-K, respectively. The first DC extractor 221-1, 221-2, . . . , 221-J (see FIG. 3) is omitted. Furthermore the second DC extractor 222-1, 222-2, . . . , 222-K may be omitted; thereby reducing hardware costs of the active antenna array 1. The DC extractor may alternatively or additionally be implemented as a second DC extractor 215*b* between the diversity corporate feed network and the diversity port 11-D. Typically the active antenna array 1 is provided with a lightning protection as indicated in connection with the first port 11-1 and in connection with the diversity port 11-D. The lightning protection is required in order to minimize damage caused by any lightning reaching the active antenna array 1, which is possible due to the relatively high position of the active antenna array 1 when mounted on a mast.

It is to be understood that the general splitter 500 requires the DC voltage extractor 215 to be placed before the general splitter 500 as the general splitter 500 may not have a DC conductivity in order to forward the DC voltages to the first amplifier 201-1, 201-2, . . . , 201-J and second amplifier 202-1, 202-2, . . . , 202-K. Without any limitation it would be possible to re-inject a DC voltage after the general splitter 500.

It is an advantage of the aspect of the active antenna array 1 in FIG. 9 to eliminate a need for the directional units 406-1, 406-2, . . . , 406-J, 407-1, 407-2, . . . , 407-J and/or the directional junction 405-1, 405-2, . . . , 405-J. Any intermodulation products are prevented that might be generated from the high power individual first protocol transmit signals 70Tx-1, 70Tx-2, . . . , 70Tx-J and that might be reflected back through the corporate feed network to the first protocol base station receiver 10-1 (see FIG. 1) or radiated by the antenna in contravention of the relevant radio standards. It is a drawback of the aspect of FIG. 9 that cost/size/weight associated with the provision of the receive corporate feed network will be increased, although these increases are typically small in each case. The receive filtering element 401-1 shown between the diversity port 11-D and the diversity corporate feeder network may be omitted if the first protocol receiver (not shown) comprises an appropriate receive filtering element.

Figure 10A:
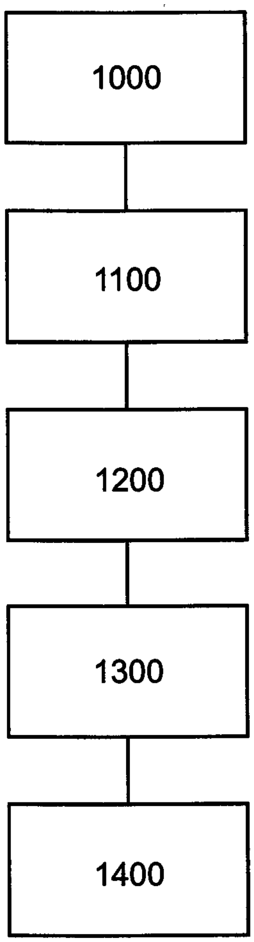
FIG. 10*a* shows a diagram for a method of relaying radio signals

The present disclosure relates to a method for relaying radio signals in a mobile communications network. FIG. 10*a* shows a diagram of the method 1000.

In a step 1100 individual first protocol receive signals and individual second protocol receive signals are concurrently received at an individual one of the plurality of first polarisation antenna elements AntP1-1, AntP1-2, . . . , AntP1-J and an individual one of the plurality of second polarisation antenna elements AntP2-1, AntP2-2, . . . , AntP2-K.

A step 1200 comprises a forwarding of first protocol receive signals.

A step 1300 comprises a transmitting of individual first protocol transmit signals 70Tx-1, 70Tx-2, . . . , 70Tx-J at individual ones of the plurality of first polarisation antenna elements AntP1-1, AntP1-2, . . . , AntP1-J.

A step 1400 comprises a transmitting of individual second protocol transmit signals 75Tx-1, 75Tx-2, . . . , 75Tx-K at individual ones of the plurality of second polarisation antenna elements AntP2-1, AntP2-2, . . . , AntP2-K.

The first protocol receive signals comprise individual first protocol first polarisation receive signals 70RxP1-1, 70RxP1-2, . . . , 70RxP1-J and individual first protocol second polarisation receive signals 70RxP2-1, 70RxP2-2, . . . , 70RxP2-K. The individual second protocol receive signals comprise individual second protocol first polarisation receive signals 75RxP1-1, 75RxP1-2, . . . , 75RxP1-J and individual second protocol second polarisation receive signals 75RxP2-1, 75RxP2-2, . . . , 75RxP2-K.

Figure 10B:
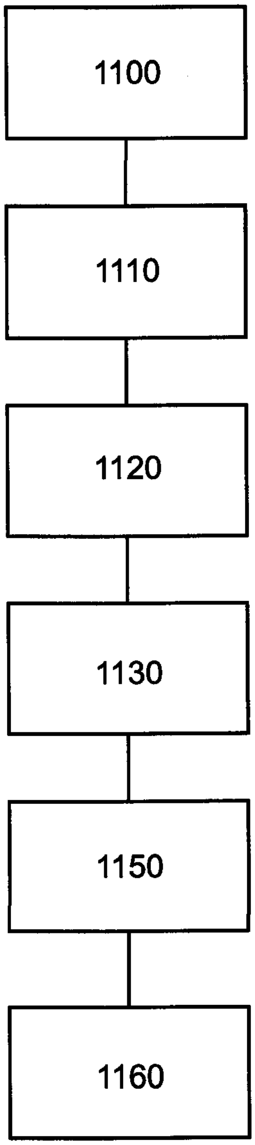
FIG. 10*b* shows details of concurrently receiving radio signals

FIG. 10*b* shows details of the step 1100 of the concurrently receiving of the individual first protocol receive signals and the individual second protocol receive signals at the individual one of the plurality of first polarisation antenna elements AntP1-1, AntP1-2, . . . , AntP1-J and the individual one of the plurality of second polarisation antenna elements AntP2-1, AntP2-2, . . . , AntP2-K.

A step 1110 comprises a concurrently receiving of the individual first protocol first polarisation receive signal 70RxP1-1, 70RxP1-2, . . . , 70RxP1-J and the individual second protocol first polarisation receive signal 75RxP1-1, 75RxP1-2, . . . , 75RxP1-J of an individual one of the plurality of first polarisation antenna elements AntP1-1, AntP1-2, . . . , AntP1-J.

A step 1120 comprises a concurrently receiving of the individual first protocol second polarisation receive signal 70RxP2-1, 70RxP2-2, . . . , 70RxP2-K and an individual second protocol second polarisation receive signal 75RxP2-1, 75RxP2-2, . . . , 75RxP2-K at an individual one of the plurality of second polarisation antenna elements AntP2-1, AntP2-2, . . . , AntP2-K.

A step 1130 comprises amplifying first polarisation receive signals and/or second polarisation receive signals. The amplifying of the first polarisation receive signals may be implemented using the first amplifier 201-1, 201-2, . . . , 201-J. The amplifying of the second polarisation receive signals may be implemented using the second amplifier 202-1, 202-2, . . . , 202-K.

Figure 10C:
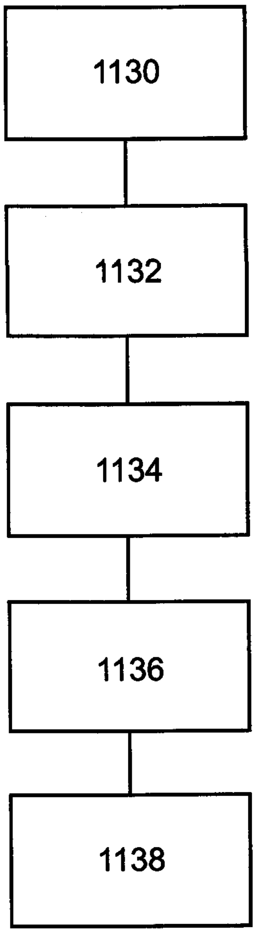
FIG. 10*c* shows details of a method for amplifying radio signals

FIG. 10*c* shows details of the step 1130 of the amplifying. A step 1134 comprises a supplying of at least one individual DC voltage 205-1, 205-2, . . . , 205-J or at least one second individual DC voltage 207-1, 207-2, . . . , 207-K. The supplying 1134 may be implemented using the DC voltage extractors and/or the DC distribution unit as described above.

A step 1136 comprises an amplifying of the individual first protocol first polarisation receive signal 70RxP1-1, 70RxP1-2, . . . , 70RxP1-J and the individual second protocol first polarisation receive signal 75RxP1-1, 75RxP1-2, . . . , 75RxP1-J for example, implemented using the first amplifier 201-1, 201-2, . . . , 201-J.

A step 1138 comprises an amplifying of the individual first protocol second polarisation receive signal 70RxP2-1, 70RxP2-2, . . . , 70RxP2-K and the individual second protocol second polarisation receive signal 75RxP2-1, 75RxP2-2, . . . , 75RxP2-K.

The method further comprises a step 1150 (see FIG. 10*b*) of extracting the individual second protocol first polarisation receive signal 75RxP1-1, 75RxP1-2, . . . , 75RxP1-J and maybe implemented using the first coupler 111-1, 111-2, . . . , 111-J.

A step 1160 comprises extracting the individual second protocol second polarisation receive signals 75RxP2-1, 75RxP2-2, . . . , 75RxP2-K and may be implemented using the second coupler 112-1, 112-2, . . . , 112-K.

Figure 10D:
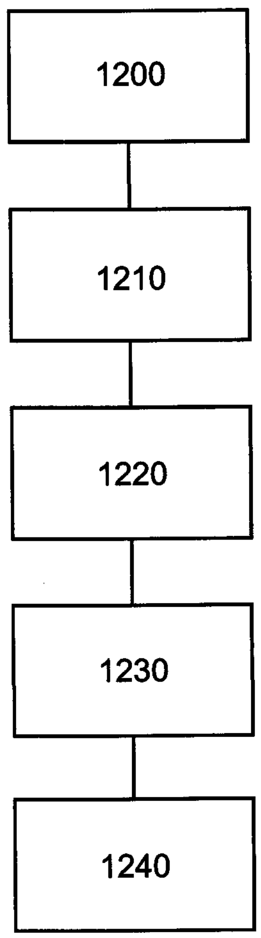
FIG. 10*d* shows details of a forwarding of first protocol receive signals

FIG. 10*d* shows details of the step 1200 of forwarding the individual first protocol receive signals.

A step 1210 comprises an optional filtering of first protocol receive signals.

A step 1220 comprises a directing of the first protocol transmit signals 70Tx-1, 70Tx-2, . . . , 70Tx-J in a first protocol transmit direction, i.e. forwards the first polarisation antenna elements AntP1-1, AntP1-2, . . . , AntP1-J. The directing of first protocol signals further comprises a directing of first protocol receive signals in the first protocol receive direction. The step 1220 may comprise using the directional junction 405-1, 405-2, . . . , 405-J and/or the directional units 406-1, 406-2, . . . , 406-J, 407-1, 407-2, . . . , 407-J as discussed with respect to FIGS. 5, 6, 7 and 8.

A step 1230 comprises an auxiliary amplifying of first protocol first polarisation receive signals 70RxP1-1, 70RxP1-2, . . . , 70RxP1-J. The step 1230 is of interest with the increased attenuation of the directional units 406-1, 406-2, . . . , 406-J, 407-1, 407-2, . . . , 407-J and the directional junction 405-1, 405-2, . . . , 405-J as discussed above.

A step 1240 comprises a forming of a general first protocol receive signal 70Rx and/or a general first protocol diversity receive signal 70Rx-D. The general first protocol diversity receive signal 70Rx-D is present at the diversity port 11-D.

Figure 10E:
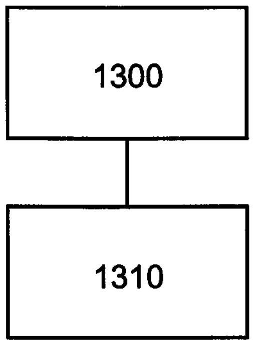
FIG. 10*e* shows details of a transmitting of first protocol transmit signals

FIG. 10*e* shows details of the transmitting of individual first protocol transmit signals 70Tx-1, 70Tx-2, . . . , 70Tx-J at the plurality of first polarisation antenna elements AntP1-1, AntP1-2, . . . , AntP1-J.

In a step 1310 individual first protocol transmit signals are generated by analogue means. The generating 1310 of the individual first protocol transmit signals 70Tx-1, 70Tx-2, . . . , 70Tx-J may be implemented using the corporate feed network starting at the first port 11-1, as discussed above. The generating 1310 may comprise applying the amplitude weighting, the phase weighting or the delay as discussed before.

Figure 10F:
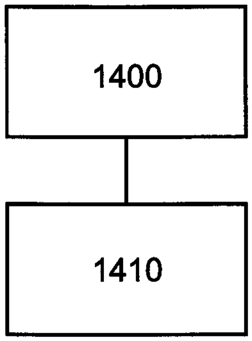
FIG. 10*f* shows details of a transmitting of second protocol transmit signals

FIG. 10*f* shows details of the step 1400 of transmitting individual second protocol transmit signals. The step 1400 comprises a step 1410 of generating second protocol transmit signals 75Tx-1, 75Tx-2, . . . , 75Tx-K by digital means. The individual second protocol transmit signals may be provided by an individual second protocol signal generator 302-1, 302-2, . . . , 302-K (see FIGS. 3, 5 to 9). The second protocol signal generator 302-1, 302-2, . . . , 302-K is adapted to apply at least one of the (variable) amplitude weighting, the (variable) phase weighting or the (variable) delay, as discussed before. There may be an individual second protocol signal generator for each one of the second polarisation antenna elements AntP2-1, AntP2-2, . . . , AntP2-K. Alternatively and/or additionally the second protocol signal generator 302 may provide more than one of the individual second protocol transmit signals 75Tx-1, 75Tx-2, . . . , 75Tx-K. In the step 1400 the individual second protocol transmit signals 75Tx-1, 75Tx-2, . . . , 75Tx-K are transmitted using the individual one of the second polarisation antenna element AntP2-1, AntP2-2, . . . , AntP2-K.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

REFERENCE NUMERALS

| | |
|---|---|
| 1a | prior art antenna array |
| 1 | active antenna array |
| Ant-1, Ant-2, . . . , Ant-N | at least one antenna element |
| AntP1-1, AntP1-2, . . . , AntP1-J | first polarisation antenna element |
| AntP2-1, AntP2-2, . . . , AntP2-K | second polarisation antenna element |
| 10-1 | first protocol BTS |
| 10-2 | second protocol BTS |
| 11-1 | first port |
| 11-D | diversity port |
| 11-2 | second port |
| 101-1, 101-2, . . . , 101-J | first splitter |
| 102-1, 102-2, . . . , 101-K | second splitter |
| 201-1, 201-2, . . . , 201-J | first amplifier |
| 203-1, 203-2, . . . , 203-J | auxiliary amplifier |
| 202-1, 202-2, . . . , 202-K | second amplifier |
| 70Tx | general first protocol transmit signal |
| 75Tx | general second protocol transmit signal |

-continued

| | |
|---|---|
| 70Rx | general first protocol receive signal |
| 75Rx | general second protocol receive signal |
| 70RxP1-1, 70RxP1-2, . . . , 70RxP1-J | individual first protocol first polarisation receive signal |
| 70RxP2-1, 70RxP2-2, . . . , 70RxP2-K | individual first protocol first polarisation receive signal |
| 75RxP1-1, 75RxP1-2, . . . , 75RxP1-J | individual second protocol first polarisation receive signal |
| 75RxP2-1, 75RxP2-2, . . . , 70RxP2-K | individual first protocol first polarisation receive signal |
| 111-1, 111-2, . . . , 111-J | first coupler |
| 112-1, 112-2, . . . , 112-K | second coupler |
| 221-1, 221-2, . . . , 221-J | first DC extractor |
| 222-1, 222-2, . . . , 222-K | second DC extractor |
| 205-1, 205-2, . . . , 205-J | first individual DC voltage |
| 207-1, 207-2, . . . , 207-K | second individual DC voltage |
| 401-1, 401-2, . . . , 401-J | first receive filtering element |
| 402-2, 402-2, . . . , 402-K | second receive filtering element |
| 405-1, 405-2, . . . , 405-J | directional junction |
| 406-1, 406-2, . . . , 406-J | directional unit |
| 407-2, 407-2, . . . , 407-J | second directional unit |
| 300 | first protocol signal generator |
| 302-1, 302-2, . . . , 302-K | second protocol signal generator |
| 1000 | method for relaying radio signals in mobile communications network |
| 1100 | concurrently receiving individual first protocol and individual second protocol receive signals |
| 1110 | receive first protocol first polarisation receive sign. and second prot. first polarisation receive signals |
| 1120 | receive first protocol second polarisation receive sign. and second prot. second polarisation receive signals |
| 1130 | amplifying $1^{st}$ pol. receive signals and $2^{nd}$ pol. receive signals |
| 1134 | provide ind. $1^{st}$ and/or ind. $2^{nd}$ DC voltage |
| 1136 | amplifying $1^{st}$ pol. receive signals |
| 1138 | amplifying $2^{nd}$ pol. receive signals |
| 1150 | extract $2^{nd}$ prot. $1^{st}$ pol. receive signals |
| 1160 | extract $2^{nd}$ prot. $2^{nd}$ pol receive signals |
| 1200 | forwarding $1^{st}$ prot receive signals |
| 1210 | filtering $1^{st}$ prot. receive signal |
| 1220 | directing $1^{st}$ prot. signals |
| 1230 | auxiliary amplifying $1^{st}$ prot. receive signals |
| 1240 | forming general $1^{st}$ prot receive signal |
| 1300 | transmit $1^{st}$ prot. transmit (Tx) signal |
| 1310 | generate individual $1^{st}$ prot. Tx signals |
| 1400 | transmit $2^{nd}$ prot Tx signals |
| 1410 | generate individual $2^{nd}$ prot. Tx signals |
| 1420 | forwarding individual first and second protocol receive signals |

The invention claimed is:

1. An active antenna array for a mobile communication network comprising:

a plurality of first polarisation antenna elements being connected to a first protocol signal generator, the plurality of first polarisation antenna elements being adapted to radiate an individual first protocol transmit signal;

a plurality of second polarisation antenna elements; an individual one of the plurality of second polarisation antenna elements being connected to an individual one of a plurality of second protocol signal generators, the plurality of second polarisation antenna elements being adapted to radiate, an individual second protocol transmit signal;

at least one directional unit, wherein an individual one of the plurality of first polarisation antenna elements and the individual one of the plurality of second polarisation antenna elements are adapted to receive both an individual first protocol receive signal and an individual second protocol receive signal; and wherein the at least one directional unit is adapted to reduce a signal component of at least one of the individual first protocol receive signals being relayed along at least one of a first transmit path.

2. The active antenna array according to claim 1, wherein the individual first protocol receive signal comprises:

a first protocol first polarisation receive signal; and a first protocol second polarisation receive signal.

3. The active antenna array according to claim 1, wherein the individual second protocol receive signal comprises:

a second protocol first polarisation receive signal; and a second protocol second polarisation receive signal.

4. The active antenna array (1) according to claim 1, wherein the at least one directional unit corn rises:

at least a first splitter coupled to the individual one of the plurality of first polarisation antenna elements, the at least one first splitter being adapted to forward at least one of an at least one individual first protocol first polarisation receive signal and an at least one individual second protocol first polarisation receive signal in a receive direction from the individual one of the plurality of first polarisation antenna elements to an at least one first amplifier.

5. The active antenna array according to claim 4, wherein the at least one first splitter is further adapted to forward the individual first protocol transmit signal in a transmit direction to the individual first polarisation antenna element.

6. The active antenna array according to claim 1, further comprising:

at least one second splitter coupled to the individual one of the plurality of second polarisation antenna elements, the at least one second splitter being adapted to forward at least one of an at least one individual first protocol second polarisation receive signal and an at least one individual second protocol second polarisation receive signal in a receive direction from the individual one of the plurality of second polarisation antenna elements to an at least one second amplifier.

7. The active antenna array according to claim 6, wherein the at least one second splitter is further adapted to forward an individual second protocol transmit signal in a transmit direction to the individual second polarisation antenna element.

8. The active antenna array according to claim 1, further comprising:

at least one first amplifier located in an individual relay path in the receive direction downstream of the first polarisation antenna element, the at least one first amplifier amplifying the individual first protocol first polarisation receive signal and the individual second protocol first polarization receive signal.

9. The active antenna array according to claim 8, wherein the at least one directional unit further comprises at least one first receive filtering element located in the receive direction downstream of the at least one first amplifier and comprising a stop band in a transmit band of the individual first protocol transmit signals.

10. The active antenna array according to claim 8, further comprising:

an at least one first DC voltage extractor for extracting a first individual DC voltage, supplying the at least one first amplifier.

11. The active antenna array according to claim 8, further comprising:

a DC distribution unit providing at least one of the first individual DC voltage or the second individual DC voltage.

12. The active antenna array according to claim 1, comprising:

at least one second amplifier located in an individual relay path in the receive direction downstream of the second polarisation antenna element, the at least one second amplifier amplifying an individual first protocol second polarisation receive signal and an individual second protocol second polarisation receive signal.

13. The active antenna array according to claim 12, comprising:

an at least one second receive filtering element located in the receive direction downstream of the at least one second amplifier and comprising a stop band in the transmit band of the individual first protocol transmit signals.

14. The active antenna array according to claim 12, further comprising:

an at least one second DC voltage extractor for extracting a second individual DC voltage, the second individual DC voltage supplying the at least one second amplifier.

15. The active antenna array according to claim 1, comprising:

an at least one first coupler located in the individual relay path in the receive direction downstream of the first polarisation antenna element, for extracting the individual second protocol first polarisation receive signal.

16. The active antenna array according to claim 1, comprising:

an at least one second coupler located in the individual relay path in the receive direction downstream of the second polarisation antenna element, for extracting the individual second protocol second polarisation receive signal.

17. The active antenna array according to claim 1, further comprising a first port; the first port being adapted to forward individual first protocol transmit signals to individual ones of the relay paths; and the first port being adapted to generate a general first protocol receive signal from the individual first protocol first polarisation receive signals and the individual first protocol second polarisation receive signals.

18. The active antenna array according to claim 1, further comprising a first protocol link connecting the first input to the first protocol signal generator.

19. The active antenna array according to claim 1, wherein the first protocol signal generator comprises a first protocol signal receiver.

20. The active antenna array according to claim 1, comprising a first diversity port adapted to generate a diversity first protocol first polarisation receive signal from the individual first protocol first polarisation receive signals.

21. The active antenna array according to claim 1, further comprising:

at least one auxiliary amplifier located in the individual relay path in the receive direction downstream of the first amplifier the at least one auxiliary amplifier amplifying at least one of the individual first protocol first polarisation receive signal and the individual second protocol first polarisation receive signal.

22. The active antenna array according to claim 1, whereas:

the at least one directional unit comprises at least one directional junction located in the receive direction downstream of the at least one first polarisation antenna element, the at least one directional junction being adapted for relaying the individual first protocol transmit signal in a transmit direction; and adapted to forward the individual first protocol first polarisation receive signal in the receive direction; the at least one directional junction being selected from the group consisting of a quadrature hybrid, a circulator, and a triplexer.

23. The active antenna array according to claim 1, comprising a second diversity port adapted to generate a diversity first protocol second polarisation receive signal from the individual first protocol second polarisation receive signals.

24. A method for relaying radio signals in a mobile communications network, the method comprising:

a concurrently receiving of an individual first protocol receive signal and an individual second protocol receive signals at an individual one of a plurality of first polarisation antenna elements and an individual one of a plurality of second polarisation antenna elements;

transmitting individual first protocol transmit signals generated by analogue means using at least an individual one of the plurality of first polarisation antenna elements;

transmitting individual second protocol transmit signals generated by digital means using at least an individual one of the plurality of second polarisation antenna elements;

reducing a signal componenet being relayed in a direction opposite to a receive direction.

25. The method according to claim 24, further comprising: forwarding first protocol receive signals in a receive direction.

26. The method according to claim 24, the concurrently receiving comprising:

concurrently receiving a first protocol first polarisation receive signal and a second protocol first polarisation receive signal at an individual one of the plurality of first polarisation antenna elements;

concurrently receiving a first protocol second polarisation receive signal and a second protocol second polarisation receive signal at an individual one of the plurality of second polarisation antenna elements; and amplifying first polarisation receive signals and second polarisation receive signals.

27. The method according to claim 26, the amplifying further comprising:

supplying at least one of at least one first individual DC voltage or at least one second individual DC voltage;

amplifying the individual first protocol first polarisation receive signal and the individual second protocol first polarisation receive signal;

amplifying the individual first protocol second polarisation receive signal and the individual second protocol second polarisation receive signal.

28. The method according to claim 26, the concurrently receiving further comprising:

extracting the individual second protocol first polarisation receive signal;

extracting the individual second protocol second polarisation receive signal.

29. The method according to claim 24, the forwarding comprising:

directing first protocol transmit signals in a first protocol transmit direction and first protocol receive signals in the receive direction;

auxiliary amplifying first protocol first polarisation receive signals;

forming at least one of a general first protocol receive signal and a general first protocol diversity receive signal.

30. The method according to claim 24, further comprising:

transmitting an individual first protocol transmit signal using the individual one of the plurality of first polarisation antenna elements;

transmitting the individual second protocol transmit signal using the individual one of the plurality of second polarisation antenna elements.

31. A computer program product comprising a non-transitory computer usable medium having control logic stored therein for causing a computer to manufacture an active antenna array for a mobile communications network, the active antenna array comprising:

a plurality of first polarisation antenna elements being connected to a first protocol signal generator, the plurality of first polarisation antenna elements being adapted to radiate an individual first protocol transmit signal;

a plurality of second polarisation antenna elements; an individual one of the plurality of second polarisation antenna elements being connected to an individual one of a plurality of second protocol signal generators, the plurality of second polarisation antenna elements being adapted to radiate, an individual second protocol transmit signal;

at least one directional unit, wherein an individual one of the plurality of first polarisation antenna elements and the individual one of the plurality of second polarisation antenna elements are adapted to receive both an individual first protocol receive signal and an individual second protocol receive signal; and wherein the at least one first directional unit is adapted to reduce a signal component of at least one of the individual first protocol receive signals being relayed along at least one of a first transmit path.

32. A computer program product comprising a computer usable medium having control logic stored therein for causing a computer to execute a method for relaying radio signals in a mobile communications network, the control logic comprising:

first computer readable program code means for causing the computer to concurrently receive an individual first protocol receive signal and an individual second protocol receive signal at an individual one of a plurality of first polarisation antenna elements and a an individual one of a plurality of second polarisation antenna elements;

second computer readable program code means for causing the computer to concurrently receive a first protocol second polarisation receive signal and a second protocol second polarisation receive signal at an individual one of the plurality of second polarisation antenna elements; and third computer readable program code means for causing the computer to transmit individual first protocol transmit signals generated by analogue means;

fourth computer readable program code means for causing the computer to transmit (1400) individual second protocol transmit signals generated by digital means;

fifth computer readable program code means for causing the computer to reduce a signal component being relayed in a direction opposite to the receive direction.

* * * * *

UNITED STATES PATENT AND TRADEMARK OFFICE

CERTIFICATE OF CORRECTION

PATENT NO. : 8,433,242 B2
APPLICATION NO. : 12/648852
DATED : April 30, 2013
INVENTOR(S) : Peter Kenington et al.

It is certified that error appears in the above-identified patent and that said Letters Patent is hereby corrected as shown below:

In the Claims:

Col. 22, Claim 4, line 58, “one directional unit corn rises:”

should read -- one directional unit comprises: --;

Col. 24, Claim 24, line 66, “reducing a signal componenet”

should read -- reducing a signal component --.

Signed and Sealed this
Sixteenth Day of July, 2013

Teresa Stanek Rea
*Acting Director of the United States Patent and Trademark Office*